United States Patent
Wang et al.

(10) Patent No.: US 11,553,553 B2
(45) Date of Patent: Jan. 10, 2023

(54) CONFIGURING DISCONTINUOUS RECEPTION ON A SIDELINK

(71) Applicant: QUALCOMM Incorporated, San Diego, CA (US)

(72) Inventors: Kaidong Wang, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 17/148,464

(22) Filed: Jan. 13, 2021

(65) Prior Publication Data
US 2022/0225466 A1    Jul. 14, 2022

(51) Int. Cl.
| H04W 4/00 | (2018.01) |
| H04W 76/28 | (2018.01) |
| H04W 8/00 | (2009.01) |
| H04W 72/04 | (2009.01) |
| H04W 72/12 | (2009.01) |
| H04W 76/27 | (2018.01) |

(52) U.S. Cl.
CPC .......... H04W 76/28 (2018.02); H04W 8/005 (2013.01); H04W 72/042 (2013.01); H04W 72/1289 (2013.01); H04W 76/27 (2018.02)

(58) Field of Classification Search
None
See application file for complete search history.

(56) References Cited

U.S. PATENT DOCUMENTS

| 2020/0092685 A1* | 3/2020 | Fehrenbach | H04W 4/46 |
| 2020/0245395 A1* | 7/2020 | Zhang | H04L 5/0053 |
| 2021/0068200 A1* | 3/2021 | Shan | H04W 8/183 |
| 2021/0227620 A1* | 7/2021 | Pan | H04L 1/1819 |

OTHER PUBLICATIONS

Intel Corporation: "Multi-TRP Enhancements for PDCCH, PUCCH and PUSCH", 3GPP TSG RAN WG1 #103-e, 3GPP Draft, R1-2008978, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26,2020-Nov. 13, 2020, 17 Pages, Oct. 24, 2020 (Oct. 24, 2020), XP051946762.
International Search Report and Written Opinion—PCT/US2022/070163—ISA/EPO—dated May 3, 2022.

(Continued)

*Primary Examiner* — Zewdu A Beyen
(74) *Attorney, Agent, or Firm* — Patterson + Sheridan, LLP

(57) ABSTRACT

Certain aspects of the present disclosure provide a method of wireless communications, including: receiving, at a first user equipment from a network, a sidelink discontinuous reception (DRX) configuration; configuring a sidelink DRX cycle at the first user equipment based on the sidelink DRX configuration; receiving, at the first user equipment from the network, data for a second user equipment; and sending, from the first user equipment to the second user equipment on a sidelink in accordance with the sidelink DRX cycle, the data for the second user equipment.

24 Claims, 17 Drawing Sheets

(56) References Cited

OTHER PUBLICATIONS

LG Electronics: "Discussion on Physical Layer Design Considering Sidelink DRX Operation", 3GPP TSG RAN WG1 #103-e, 3GPP Draft, R1-2007897, 3rd Generation Partnership Project (3GPP), Mobile Competence Centre, 650, Route Des Lucioles, F-06921 Sophia-Antipolis Cedex, France, vol. RAN WG1, No. E-Meeting, Oct. 26, 2020-Nov. 13, 2020, Oct. 24, 2020 (Oct. 24, 2020), 16 Pages, XP051946545.
LG Electronics Inc: "Discussion on Sidelink DRX", 3GPP TSG-RAN WG2 Meeting #112 electronic, 3GPP Draft; R2-2008943, 3rd Generation Partnership Project (3GPP), Mobile Competence Centre, 650, Route Des Lucioles, F-06921 Sophia-Antipolis Cedex, France, vol. RAN WG2 , No. electronic; Online, Nov. 2, 2020-Nov. 13, 2020, pp. 1-6, Oct. 23, 2020 (Oct. 23, 2020), XP051941993.

\* cited by examiner

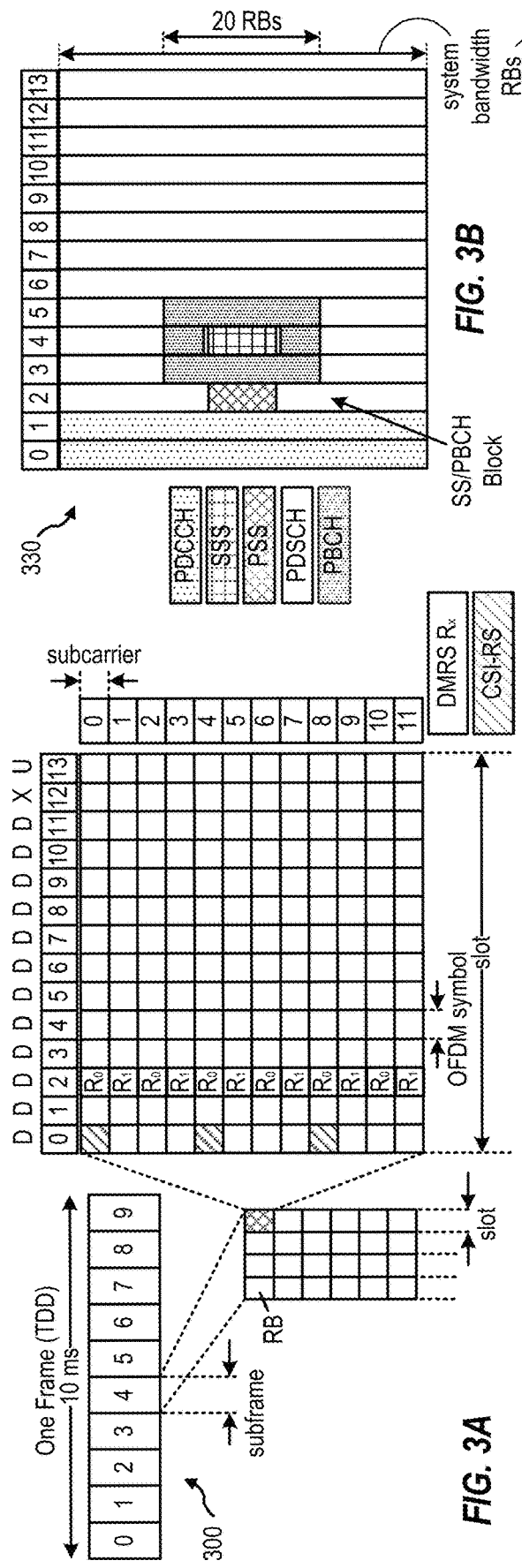
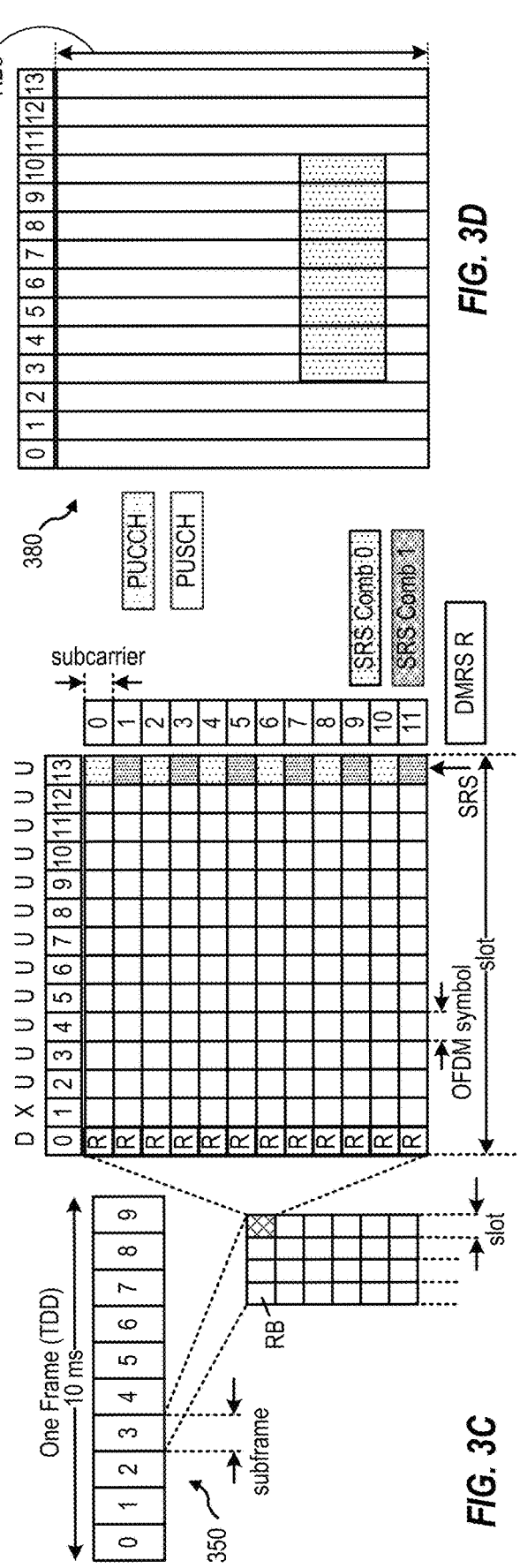
FIG. 3A
FIG. 3B
FIG. 3C
FIG. 3D

```
SystemInformationBlockType18::= SEQUENCE {
...
commDRXConfig
...
}
```

```
SystemInformationBlockType19-r12 ::= SEQUENCE {
...
DRXInfoList
...
}
```

CONFIGURING DISCONTINUOUS RECEPTION ON A SIDELINK

BACKGROUND

Aspects of the present disclosure relate to wireless communications, and more particularly, to techniques for configuring discontinuous reception (DRX) on sidelink communication channels.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method of wireless communications, comprising: receiving, at a first user equipment from a network, a sidelink discontinuous reception (DRX) configuration; configuring a sidelink DRX cycle at the first user equipment based on the sidelink DRX configuration; receiving, at the first user equipment from the network, data for a second user equipment; and sending, from the first user equipment to the second user equipment on a sidelink in accordance with the sidelink DRX cycle, the data for the second user equipment.

Another aspect provides a method of wireless communications, comprising: configuring a sidelink discontinuous reception (DRX) cycle at the first user equipment; sending, from the first user equipment to a second user equipment, a sidelink DRX configuration; receiving, at the first user equipment from the network, data for the second user equipment; and sending, from the first user equipment to the second user equipment on a sidelink in accordance with the sidelink DRX cycle, the data for the second user equipment.

Another aspect provides a method of wireless communications, comprising: receiving, at a first user equipment from a second user equipment, a sidelink discontinuous reception (DRX) configuration; configuring a DRX cycle at the first user equipment based on the sidelink DRX configuration received from the second user equipment; receiving, at the first user equipment from the network, data for the second user equipment; and sending, from the first user equipment to the second user equipment on a sidelink in accordance with the sidelink DRX cycle, the data for the second user equipment.

Another aspect provides a method of wireless communications, comprising: sending, from a network to a first user equipment, a sidelink discontinuous reception (DRX) configuration; and receiving, at the network from the first user equipment, an indication that the sidelink DRX reconfiguration is complete.

Another aspect provides a method of wireless communications, comprising receiving at a network from a user equipment, sidelink discontinuous reception (DRX) configuration information.

Other aspects provide: an apparatus operable, configured, or otherwise adapted to perform the aforementioned methods as well as those described elsewhere herein; non-transitory, computer-readable media comprising instructions that, when executed by one or more processors of a processing system, cause the processing system to perform the aforementioned methods as well as those described elsewhere herein; a computer program product embodied on a computer readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE FIGURES

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses and methods for configuring discontinuous reception (DRX) on sidelink communication channels.

Sidelink communications, also referred to as device-to-device (D2D) communication, enable myriad enhanced capabilities in wireless devices. For example, sidelink communications may enable a network to send data to a target wireless device that is not connected to the network via a relay wireless device that is connected to the network. As another example, sidelink communications may enable various safety features, such as vehicle-to-device communications that allow an approaching vehicle to notify a pedestrian with a wireless device of its imminent arrival. Many other use cases exist.

An issue with all wireless communications, including sidelink communications, for battery operated wireless devices (e.g., smartphones, smart wearables, and others) is that "listening" for such communications requires power. As such, wireless devices often implement discontinuous reception (DRX) modes in order to power down receiving equipment and save power. While power efficiency is improved, the ability to leverage advanced capabilities, such as those enabled by sidelink communications, is impacted.

Aspects described herein resolve this technical problem by coordinating sidelink DRX configurations between user equipments so that the user equipments are active at the same time—and thus need not be active as often. In other words, by aligning DRX active periods between user equipments, the user equipments ensure the ability to utilize sidelink communication capabilities while still saving power.

As described in more detail below, coordination of sidelink configurations may be accomplished with various designs. For example, a network may coordinate sidelink DRX configurations for multiple user equipments (e.g., in a relay-target relationship). As another example, a relay user equipment may coordinate sidelink configurations for itself and a target user equipment. As yet another example, a target user equipment may coordinate sidelink configurations for itself and a relay user equipment. In yet another example, a network may configure a relay user equipment's sidelink DRX cycle, and that relay user equipment may in-turn configure a target user equipment's DRX cycle.

Generally, the apparatuses and methods described herein improve network performance by, for example, extending reach and reducing data latency, and improve user equipment performance by enabling additional data sending and receiving opportunities while improving battery power. The additional data may be used to enable improved functions and capabilities at the user equipments.

Introduction to Wireless Communication Networks

Figure 1:
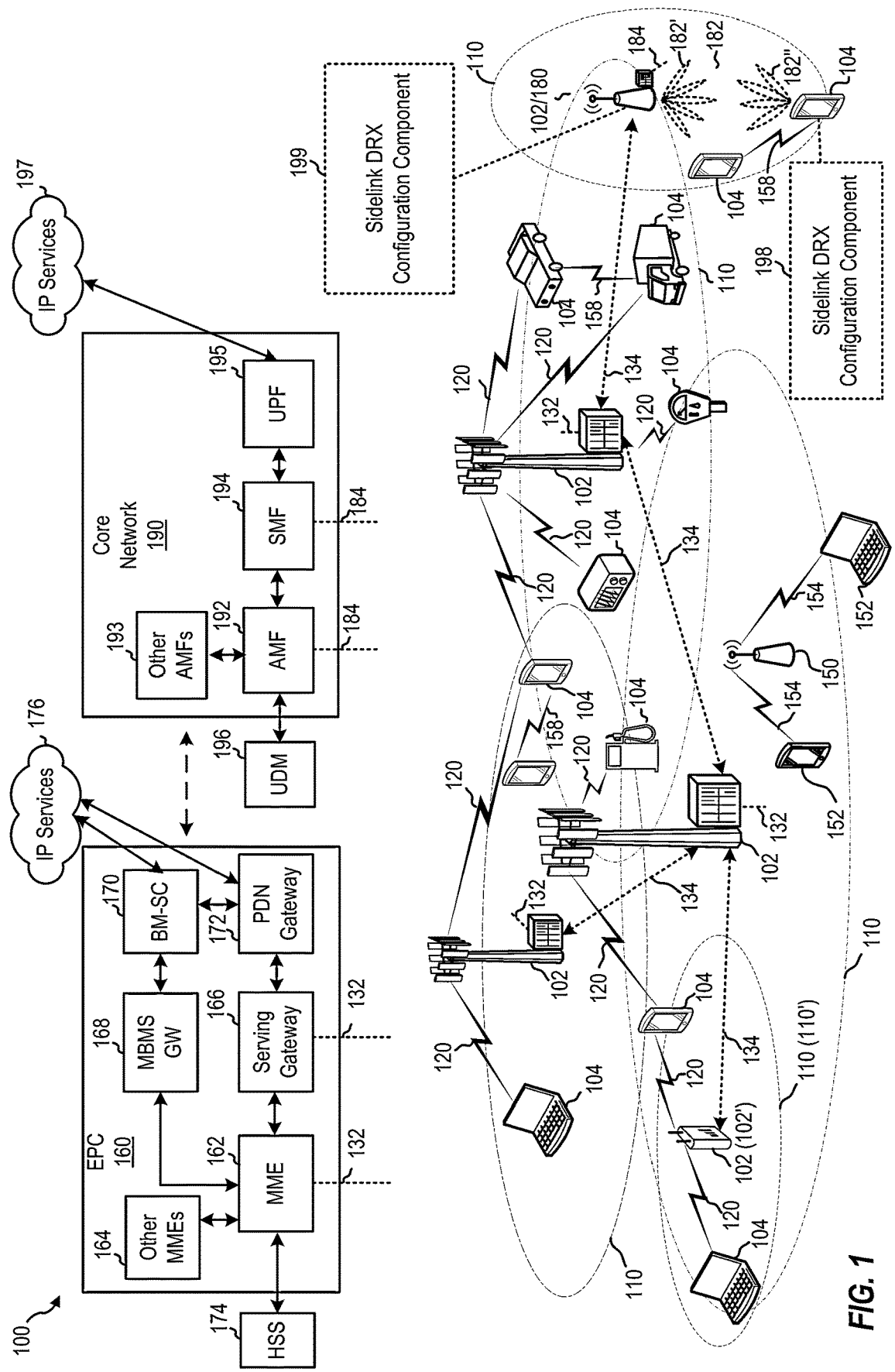
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, an Evolved Packet Core (EPC) 160, and core network 190 (e.g., a 5G Core (5GC)), which interoperate to provide wireless communications services.

Base stations 102 may provide an access point to the EPC 160 and/or core network 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, Node B, eNB, an access point, a base transceiver station, a radio base station, a radio transceiver, or a transceiver function, or a transmit reception point (TRP) in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes sidelink DRX configuration component 199, which may be used to coordinate sidelink DRX configurations between base stations 102 and UEs 104. Wireless network 100 further includes sidelink DRX configuration component 198, which may be used by UEs 104 to coordinate sidelink DRX configurations, such as between two UEs 104 (e.g., a sidelink connection 158) and base stations 102.

Figure 2:
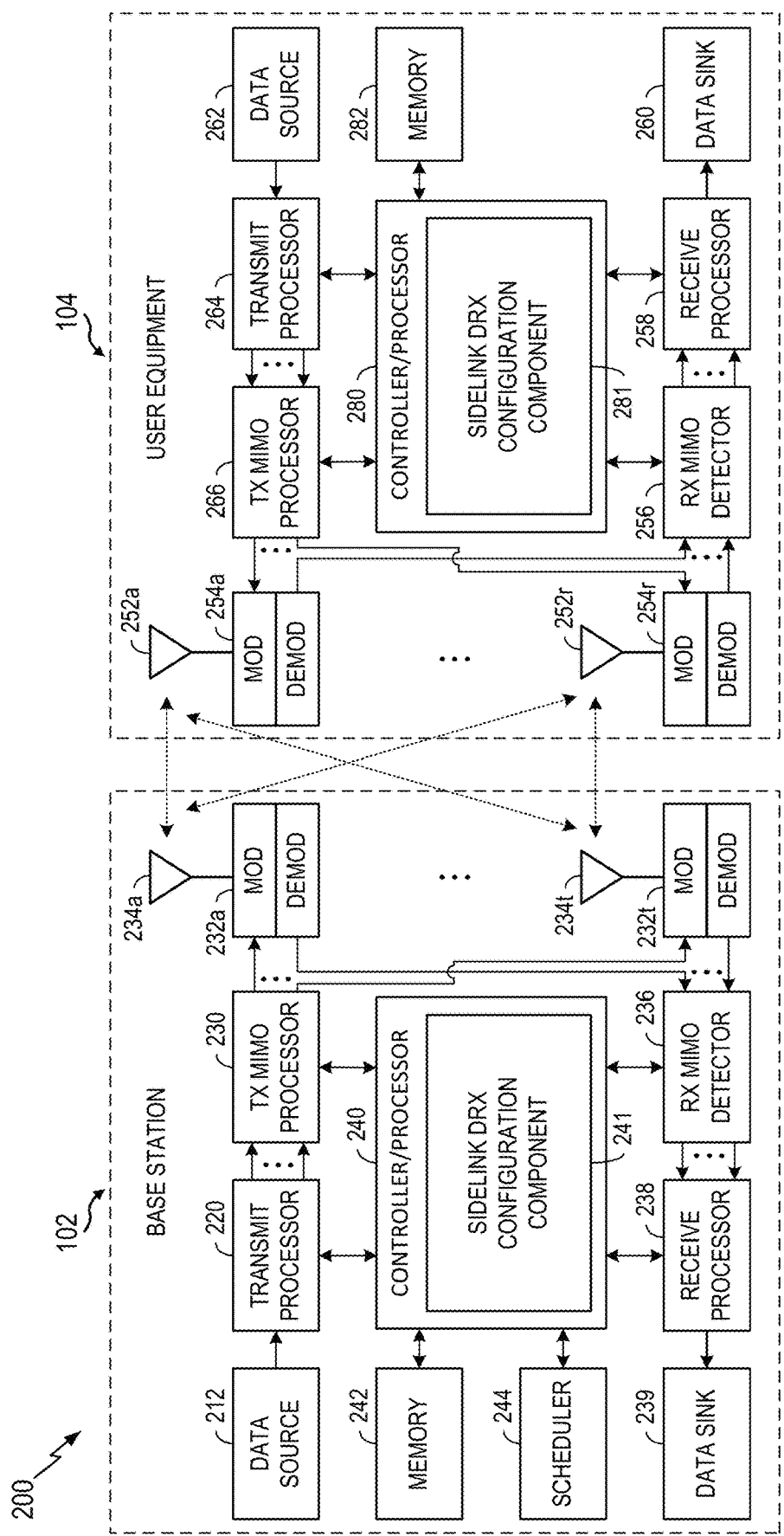
FIG. 2 is a block diagram conceptually illustrating aspects of an example a base station and user equipment.

FIG. 2 depicts aspects of a base station (BS) 102 and a user equipment (UE) 104.

Generally, BS 102 includes various processors (e.g., 220, 230, 238, and 240), antennas 234a-t, transceivers 232a-t, and other aspects, which are involved in transmission of data (e.g., source data 212) and reception of data (e.g., data sink 239). For example, BS 102 may send and receive data between itself and UE 104. BS 102 includes controller/processor 240, which sidelink DRX configuration component 241. Sidelink DRX configuration component 241 may be configured to implement base station Sidelink DRX configuration 199 of FIG. 1.

Generally, UE 104 includes various processors (e.g., 258, 264, 266, and 280), antennas 252a-r, transceivers 254a-r, and other aspects, involved in transmission of data (e.g., source data 262) and reception of data (e.g., data sink 260). UE 104 includes controller/processor 280, which comprises Sidelink DRX configuration component 281. Sidelink DRX configuration component 281 may be configured to implement user equipment distributed antenna panel component 198 of FIG. 1.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Figure 4A:
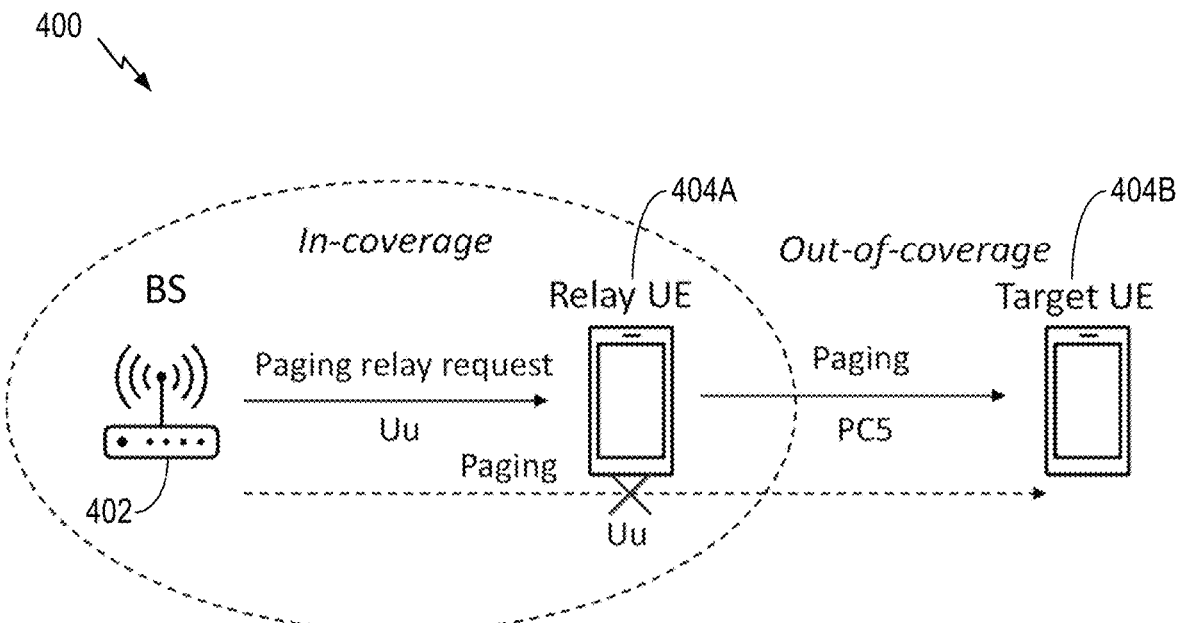
FIGS. 4A and 4B depicts an examples of scenarios in which it may be beneficial to configure DRX on a sidelink communication channel.
Figure 4B:
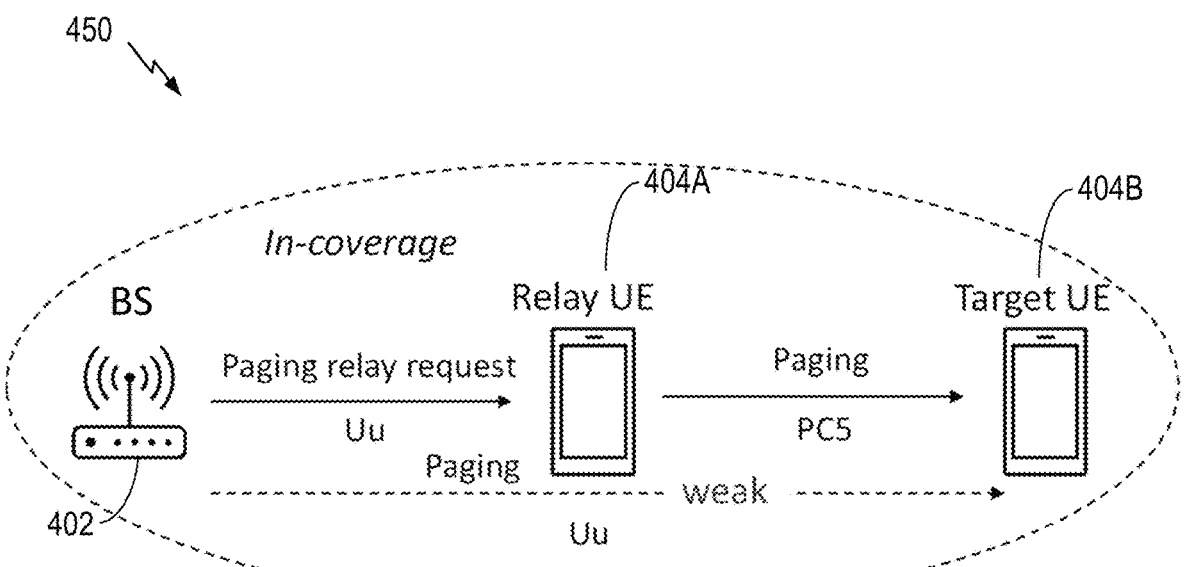

Aspects Related to Configuring Discontinuous Reception on a Sidelink Communication Channel FIGS. 4A and 4B depicts an examples of scenarios in which it may be beneficial to configure discontinuous reception (DRX) on a sidelink communication channel.

In particular, FIG. 4A depicts an example scenario 400 in which a base station 402 (such as base station 102 in FIGS. 1 and 2) is trying to send data to a target user equipment 404B, which is out of coverage of base station 402. That is, in this example, no Uu interface exists between base station 402 and target UE 404B. Further in this example, the data being sent by base station 402 is a paging message; however, in other examples, base station 402 may be attempting to send other sort of data to target user equipment 404B.

In order to resolve the coverage problem, base station 402 can send a data relay request to relay user equipment 404A, which in this example includes a paging message intended for target user equipment 404B. In this case, base station 402 is able to send the paging relay request because it is in-coverage (e.g., via a Uu interface) to relay user equipment 404A.

Relay user equipment 404A then forwards the paging message to target user equipment 404B via an alternative communication channel. In this example, the alternative communication channel is a sidelink communication channel via a PC5 interface.

FIG. 4B depicts an alternative scenario 450 in which target user equipment 404B is still within coverage of base station 402, but the connection is weak (e.g., due to a degraded channel state). For example, target user equipment 404B may be on the edge of base station 402's coverage area, or target user equipment 404B may be in conditions that negatively affect its connection to base station 402, such as within a building where the signals from base station 402 are heavily attenuated. Alternatively, target user equipment 404B may be idle or inactive over the Uu interface with base station 402.

Accordingly, the same relaying approach as described with respect to FIG. 4A may be used to resolve the situation of FIG. 4B. In this particular scenario, the message relayed by relay user equipment 404A may add transmit diversity by repetition, and thereby improve the reliability of the network.

Figure 5:
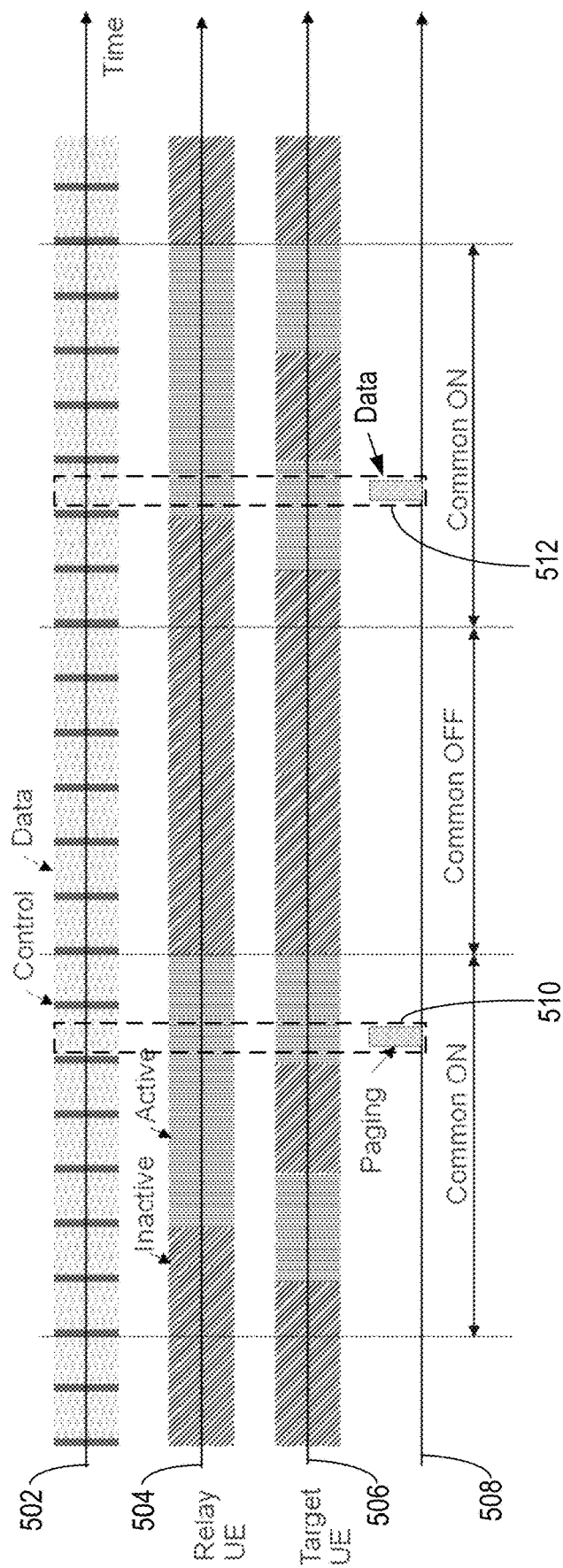
FIG. 5 depicts various timelines to illustrate aspects of configuring sidelink DRX cycles to overlap between multiple user equipments.

FIG. 5 depicts various timelines to illustrate aspects of configuring sidelink DRX cycles to overlap between multiple user equipments.

In particular, timeline 502 shows a general network timeline in which repeating blocks of time are dedicated to control messaging and to data messaging in a wireless communication network, such as network 100 of FIG. 1.

Timelines 504 and 506 depict various periods of an inactive state or an active state on a sidelink communication channel for a relay user equipment and a target user equipment, respectively. As depicted, different user equipments may have different DRX cycles (e.g., different times of active or inactive states during a common on DRX period). DRX cycles are generally periodic, and a UE may have multiple DRX cycles configured. In cases where a UE has no specific sidelink DRX configuration, it may monitor the entirety of each common on period.

In the depicted example, the network configures common on and common off periods in which all user equipments will either be inactive on the sidelink, or may be active. During common on periods, user equipment may monitor discovery/paging messages or data transmission. During common off periods, user equipments may stop monitoring any messages or data on the sidelink communication channel, but may have communication with the network on, for example, a Uu interface. The common sidelink DRX cycle configuration may be, in some cases, configured by the network in a system information broadcast (SIB).

Timeline 508 depicts a data transmission timeline in which different types of data may be transmitted from the relay user equipment to the target user equipment. In particular, during time 510 and time 512, both the relay user equipment and target user equipment are active and therefore may communicate to each other via a sidelink communication channel (e.g., as described with respect to FIGS. 4A and 4B).

It is clear from FIG. 5 that aligning sidelink DRX active times of the relay user equipment and the target user equipment beneficially facilitates the relay user equipment being able to relay data to the target user equipment, such as the paging message at time 510 and the data message (e.g., comprising data packets) at time 512. This may allow for a network to get data to the target user equipment even when it is in an idle or inactive state with respect to its connection to the network (e.g., over a Uu interface). However, it is not always the case that the relay user equipment and target relay equipment will have aligned active time periods depending on their own DRX configurations. Accordingly, configuring the relay user equipment and the target user equipment to have overlapping active periods is beneficial.

Configuring user equipments to have coordinate sidelink DRX active periods may be done in various manners. For example, a network may coordinate the configuration of the relay and target user equipments' sidelink DRX cycles to ensure alignment during at least some portion of the common on periods. As another example, a relay user equipment may coordinate the configuration of the relay and target user equipments' sidelink DRX cycles to ensure alignment during at least some portion of the common on periods. As yet another example, a target user equipment may coordinate the configuration of the relay and target user equipments' sidelink DRX cycles to ensure alignment during at least some portion of the common on periods. In further examples, some combination of user equipments and the network (e.g., a hybrid approach) may be used to coordinate the configuration of the relay and target user equipments' sidelink DRX cycles to ensure alignment during at least some portion of the common on periods. Accordingly, various methods for aligning sidelink DRX active times (e.g., by way of sidelink DRX configurations) are discussed in more detail with respect to FIGS. 6-14.

Figure 6:
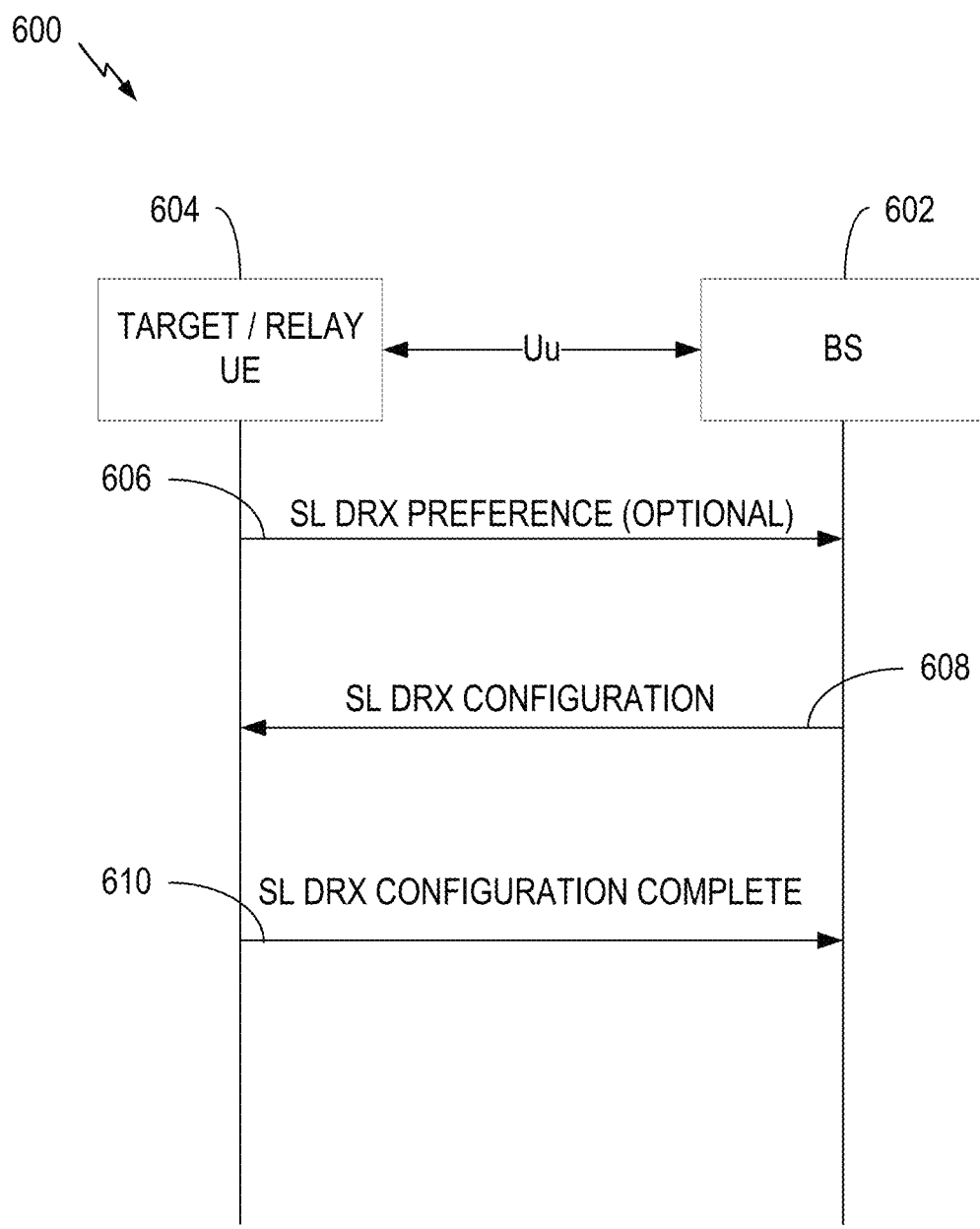
FIG. 6 depicts an example data flow between user equipments for coordinating sidelink DRX configurations between user equipments.

FIG. 6 depicts an example data flow 600 between user equipments for coordinating sidelink DRX configurations between user equipments.

The flow 600 begins at step 606 where a user equipment 604 (e.g., user equipment 104 of FIGS. 1 and 2) sends base station (e.g., base station 102 of FIGS. 1 and 2) sidelink DRX preference information. The sidelink DRX preference information may include various aspects. In one example, the sidelink DRX preference information comprises a plurality of sidelink DRX configuration options. In some cases, the plurality of sidelink DRX configurations options are in an ordered list by preference of the user equipment to which they apply (e.g., the target and/or relay user equipments).

Notably, step 606 is optional, and in the absence of any preference information from the user equipments, base station 102 may generate the configuration for the user equipments.

Flow 600 then proceeds to step 608 where base station 602 sends a sidelink DRX configuration to relay user equipment and target user equipment 604. In some cases, the sidelink DRX configuration may include multiple sidelink DRX configurations for multiple different user equipments.

In some cases, the sidelink DRX configuration at step 608 may be sent by using layer 3 signaling, such as an RRCReconfiguration message sent via radio resource control (RRC) signaling. In other cases, the sidelink DRX configuration may be sent using layer 2 or layer 1 signaling, such as via downlink control information (DCI) or a medium access control control element (MAC-CE), which is described in more detail with respect to FIGS. 10A-10C.

Target and relay user equipments 604 may their sidelink DRX cycle based on the sidelink DRX configuration received at step 608.

Flow 600 then proceeds to step 610 with one or both of the target and relay user equipments 604 sending an indication that the sidelink DRX configuration is complete to base station 602. The indication may take many forms. In one example, the indication includes an RRCReconfigurationComplete message.

The sidelink DRX configurations for the relay and target user equipments may ensure that both user equipments are active during at least a portion of the common on DRX periods, as discussed with respect to FIG. 5, so that the relay and target user equipments may communicate directly on the sidelink communication channel.

Thus, FIG. 6 depicts an example of network coordination of sidelink DRX configurations for user equipments, such as the target and relay user equipments 604. In this example, base station 602 may have a direct connection to both the target and relay user equipments (e.g., via a Uu interface) in order to facilitate the direct configuration of each user equipment. Note that while FIG. 6 discusses two user equipments (relay and target), in other cases, the network may configure sidelink DRX cycles for any number of user equipments in any number of target/relay relationships with each other.

Figure 7:
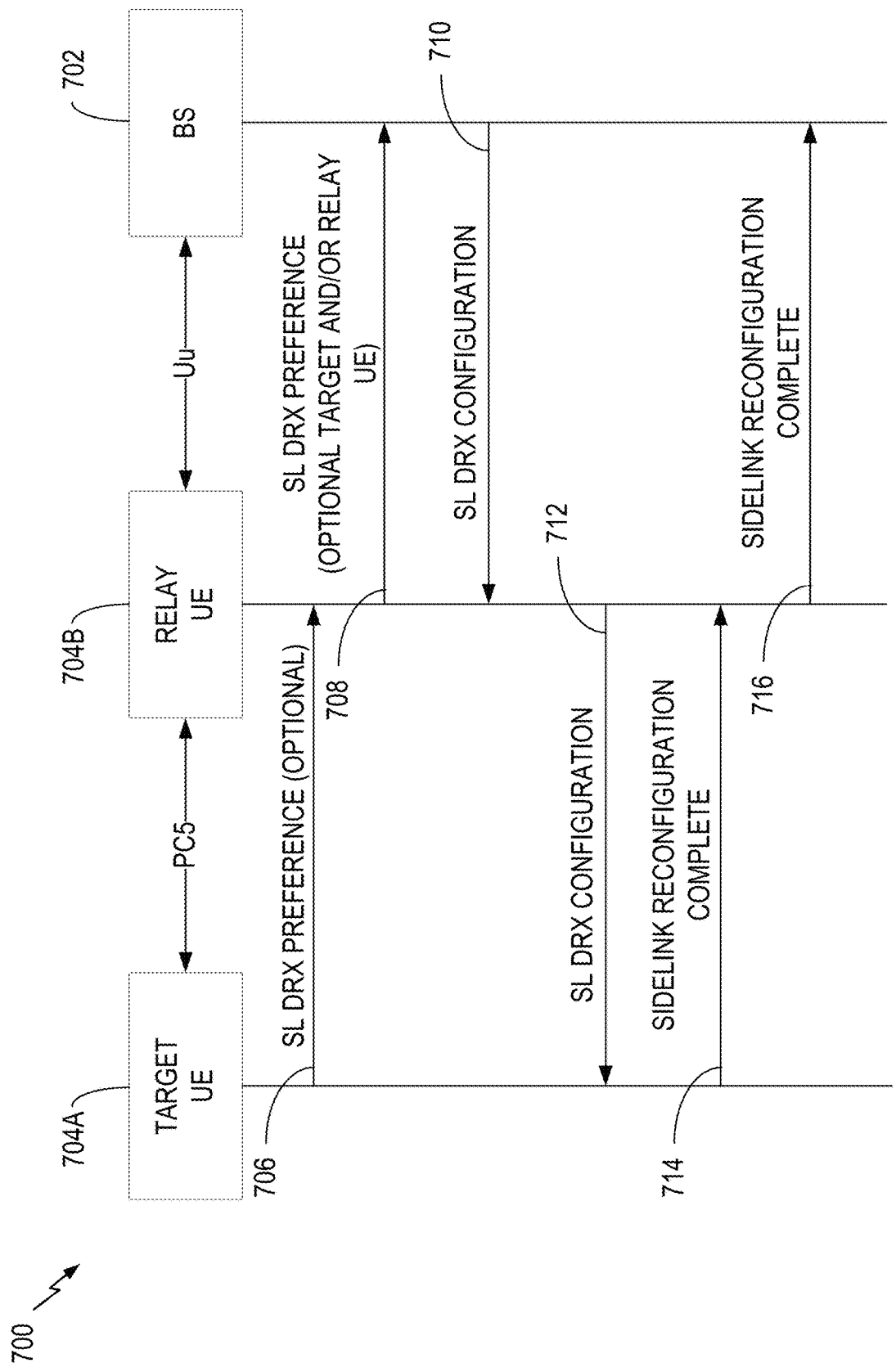
FIG. 7 depicts another example data flow between user equipments for coordinating sidelink DRX configurations between user equipments.

FIG. 7 depicts another example data flow 700 between user equipments for coordinating sidelink DRX configurations between user equipments.

The flow 700 begins at step 706 where target user equipment 704A sends sidelink DRX preference information to relay user equipment 704B. Relay user equipment 704B may receive the sidelink DRX preference information by various manner. In the depicted example, relay user equipment 704B may receive the sidelink DRX preference information via a PC5 sidelink connection with target user equipment 704A.

Flow 700 then proceeds to step 708 where relay user equipment 704B sends to base station 702 (e.g., base station 102 of FIGS. 1 and 2) sidelink DRX preference information from one or both of target user equipment 704A and relay user equipment 704B. In some cases, relay user equipment 704B may send joint or combined sidelink DRX preference information (e.g., related to both target and relay user equipments), such as by merging its and target user equipment 704A's sidelink DRX preference information into one message. In other cases, relay user equipment 704B may send separate messages for each of target user equipment 704A and relay user equipment 704B's sidelink DRX preference information.

As with step 706, step 708 is optional, and in the absence of any preference information from the user equipments, base station 102 may generate the configuration for the user equipments independently. In the depicted example, relay user equipment 704B and base station 702 are connected via a Uu interface, but other data connection types are possible.

Flow 700 then proceeds to step 710 where base station 102 sends a sidelink DRX configuration to relay user equipment 704B. In one example, the sidelink DRX configuration includes individual sidelink DRX configurations for each of relay user equipment 704B and target user equipment 704A (e.g., multiple user equipments).

As above, the sidelink DRX configuration at step 710 may be sent by using layer 3 signaling, such as an RRCReconfiguration message sent via RRC signaling. In other cases, the sidelink DRX configuration may be sent using layer 2 or layer 1 signaling, such as via DCI or MAC-CE, which is described in more detail with respect to FIGS. 10A-10C.

Relay user equipment 704B may configure its sidelink DRX cycle based on the sidelink DRX configuration received at step 710.

Flow 700 then proceeds to step 712 with relay user equipment 704B sending a sidelink DRX configuration to target user equipment 704A. User equipment 704B may send the sidelink DRX configuration to target user equipment 704A by various means. In the depicted example, user equipment 704B sends the sidelink DRX configuration to target user equipment 704A by way of a PC5 sidelink connection. In one example, the sidelink DRX configuration may be sent in an RRCReconfigurationSidelink message, which is configured to forward the sidelink DRX configuration to target user equipment 704A.

Flow 700 then proceeds to step 714 with target user equipment 704A sending an indication to relay user equipment 704B that the sidelink reconfiguration is complete. In one example, the indication may include an RRCReconfigurationSidelinkComplete message, which tells relay user equipment 704B that target user equipment 704A has applied the sidelink DRX configuration.

Flow 700 then proceeds to step 716 with relay user equipment 704B sending an indication that the sidelink DRX configuration is complete to base station 702. The indication that the sidelink DRX configuration is complete may take many forms. In one example, the indication includes an RRCReconfigurationComplete message, which indicates to base station 702 that the sidelink DRX configuration is applied successfully.

Thus, FIG. 7 depicts another example of a network-coordinated configuration of sidelink DRX cycles for user equipments, such as the target user equipment 704A and relay user equipment 704B in this example. However, unlike the example of FIG. 6, in this example base station 702 coordinates the sidelink DRX configuration of multiple user equipments via relay user equipment 704B. Note that while FIG. 7 discusses two user equipments (relay and target), in other cases, the network may coordinate sidelink DRX configurations for any number of user equipments in any number of target/relay relationships with each other.

Figure 8:
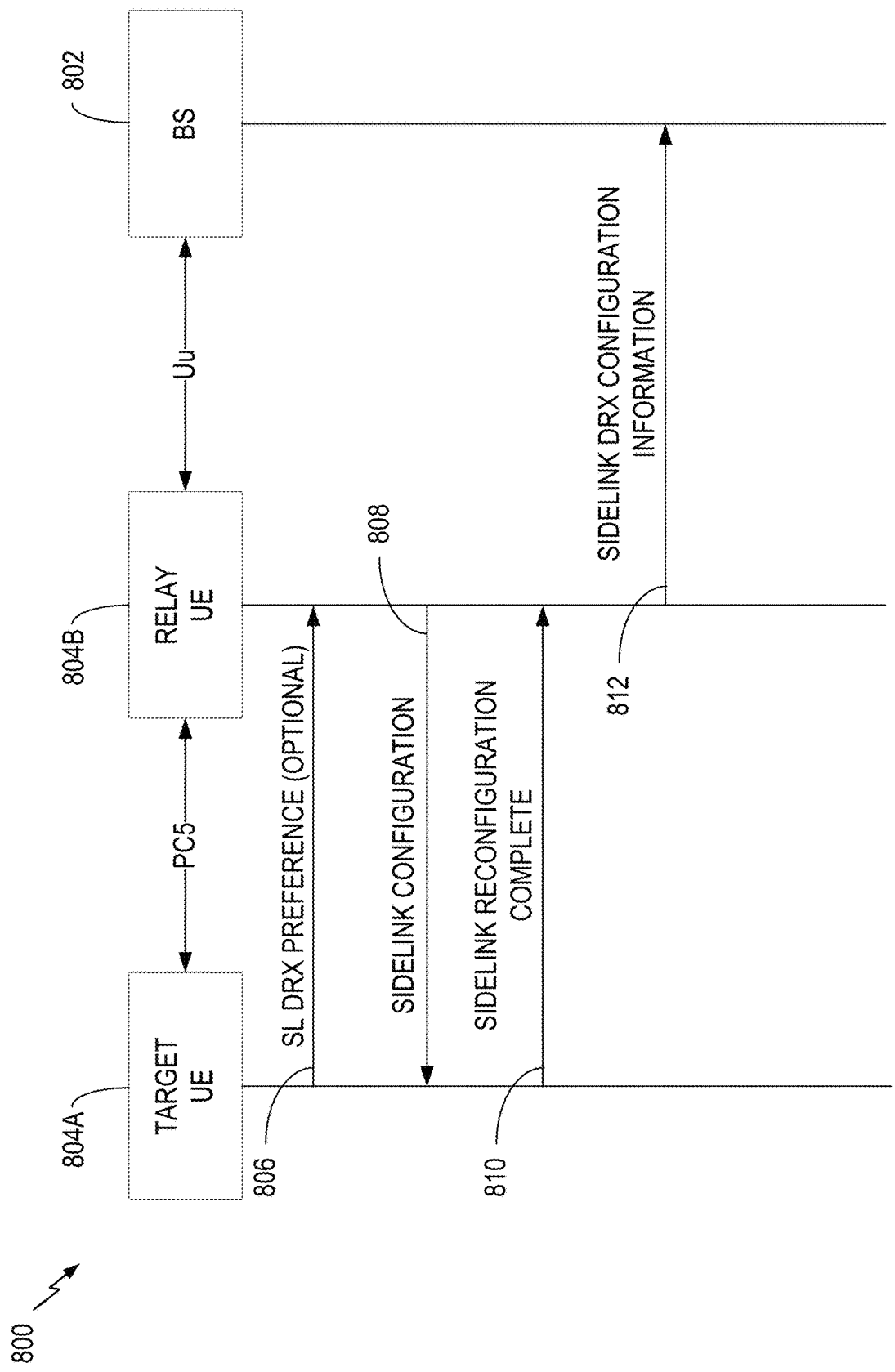
FIG. 8 depict another example data flow between user equipments and a base station for coordinating sidelink DRX configurations between user equipments.

FIG. 8 depict another example data flow 800 between user equipments and a base station for coordinating sidelink DRX configurations between user equipments.

The flow 800 begins at step 806 where a target user equipment 804A sends sidelink DRX preference information to relay user equipment 804B. The sidelink DRX preference information may include various aspects. In one example, the sidelink DRX preference information comprises a plurality of sidelink DRX configuration options. In some cases, the plurality of sidelink DRX configurations options are in an ordered list by preference of the user equipment to which they apply (e.g., the target and/or relay user equipments).

As in examples above, step 806 is optional, and in the absence of any preference information from target user equipment, relay user equipment 804B may generate the configuration for the user equipments.

Flow 800 then proceeds to step 808 where relay user equipment 804B sends a sidelink DRX configuration to target user equipment 804A.

In some cases, the sidelink DRX configuration at step 808 may be sent by using layer 3 signaling, such as an RRCReconfiguration message sent via radio resource control (RRC) signaling. In other cases, the sidelink DRX configuration may be sent using, for example, downlink control information (DCI) or a medium access control control element (MAC-CE), which is described in more detail with respect to FIGS. 10A-10C.

Target user equipment 804A may configure its sidelink DRX cycle based on the sidelink DRX configuration received at step 808.

Flow 800 then proceeds to step 810 with target user equipments 804A sending an indication that the sidelink DRX configuration is complete to relay user equipment 804B. The indication may take many forms. In one example, the indication includes an RRCReconfigurationSidelink-Complete message.

As above, the sidelink DRX configuration for the target user equipment 804A may ensure it and relay user equipment 804B are active during at least a portion of the common on DRX periods, as discussed with respect to FIG. 5, so that target user equipment 804A and relay user equipment 804B may communicate directly on the sidelink communication channel.

Flow 800 then proceeds to step 812 with relay user equipment 804B sending sidelink DRX configuration information to base station 802. The sidelink DRX configuration information may, for example, include the sidelink DRX configurations for both target user equipment 804A and relay user equipment 804B.

Note that no step is shown for relay user equipment 804B configuring its own sidelink DRX cycle in FIG. 8. This is because relay user equipment 804B may determine the sidelink configuration (sent to target user equipment 804A in step 808) based on its own existing configuration, so that no reconfiguration is necessary for relay user equipment 804B. However, in other cases, relay user equipment 804B may reconfigure its own DRX configuration based on, for example, the sidelink DRX preference information received from target user equipment 804A (if any is received) at step 806.

For example, when the network changes (e.g., a new user equipment joins or leaves, or if the common DRX cycle changes), relay user equipment 804B may reconfigure target user equipment 804A's sidelink DRX configuration (e.g., its DRX cycle, as depicted in FIG. 5) without any sidelink DRX preference information from target user equipment 804A.

However, target user equipment 804A may not accept relay user equipment 804B's sidelink DRX configuration due to conflicts. For example, target user equipment 804A may already be configured for other data traffic on the sidelink and may need another configuration from relay user equipment 804B. If target user equipment 804A does not accept relay user equipment 804B's specific sidelink DRX configuration, it may instead send sidelink DRX preference information back to relay user equipment 804B after receiving the initial sidelink configuration from relay user equipment 804B at step 808. For example, target user equipment 804A may send a list of its sidelink DRX preference with different priorities to relay user equipment 804B, and thereafter relay user equipment 804B can adjust target user equipment 804A's sidelink DRX configuration based on the highest priority option in the list of preferences that is also suitable for relay user equipment 804B.

Thus, FIG. 8 depicts an example of user equipment coordination of sidelink DRX configurations for user equipments—specifically where the relay user equipment coordinates for itself and at least one target user equipment. Note that while FIG. 8 discusses two user equipments (relay and target), in other cases, a user equipment such as relay user equipment 804B may coordinate sidelink DRX configurations for any number of target user equipments in any number of target/relay relationships with each other.

Figure 9:
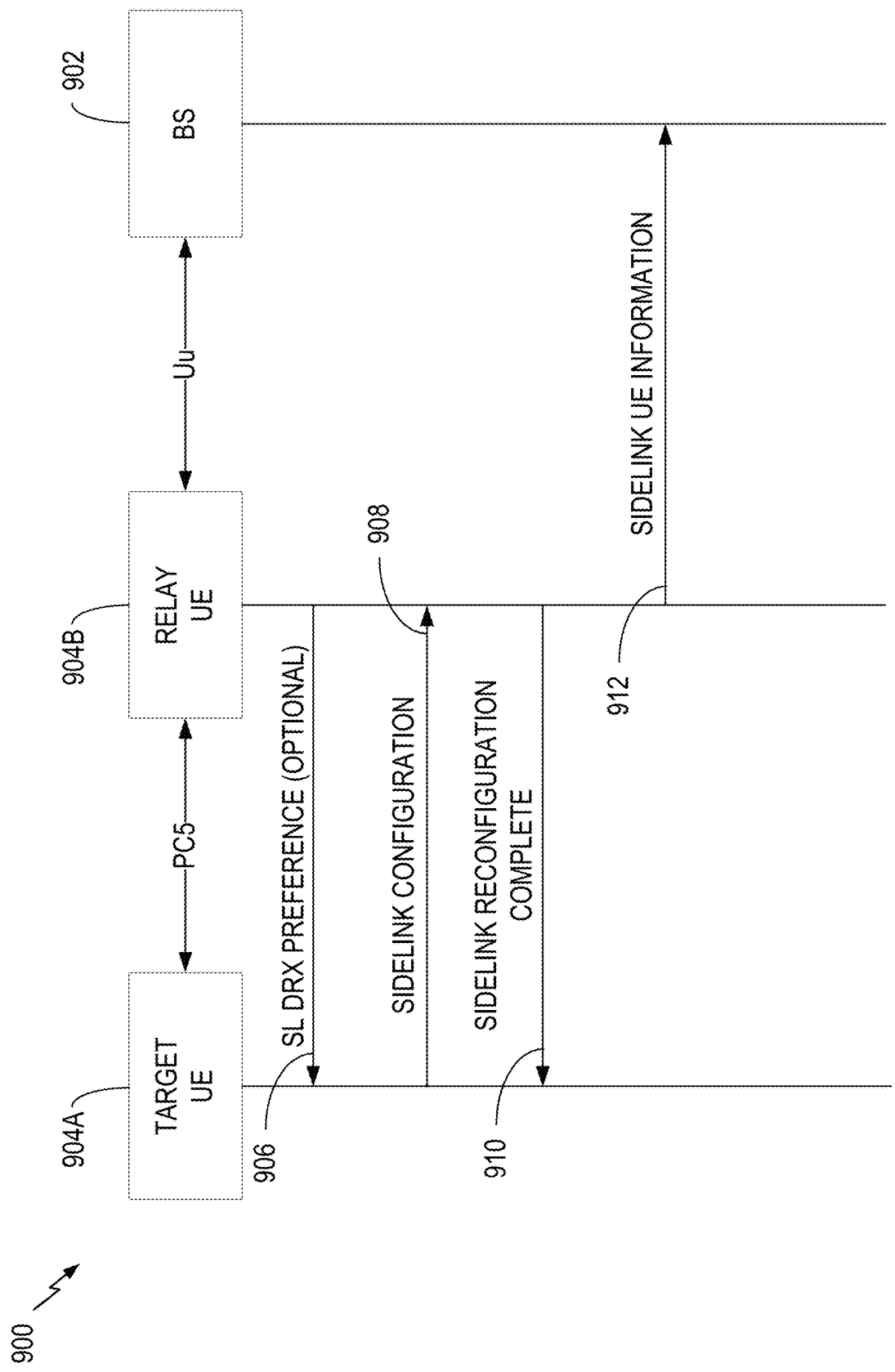
FIG. 9 depicts another example data flow between user equipments and a base station for coordinating sidelink DRX configurations between user equipments.

FIG. 9 depicts another example data flow 900 between user equipments and a base station for coordinating sidelink DRX configurations between user equipments.

The flow 900 begins at step 906 where a relay user equipment 804A sends sidelink DRX preference information to target user equipment 804A. The sidelink DRX preference information may include various aspects. In one example, the sidelink DRX preference information comprises a plurality of sidelink DRX configuration options. In some cases, the plurality of sidelink DRX configurations options are in an ordered list by preference of the user equipment to which they apply (e.g., to relay user equipment 904B in this example).

As in examples above, step 906 is optional, and in the absence of any preference information from relay user equipment, target user equipment 804A may generate the configuration for the user equipments.

Flow 900 then proceeds to step 908 where relay target equipment 804A sends a sidelink DRX configuration to relay user equipment 804B.

In some cases, the sidelink DRX configuration at step 908 may be sent by using layer 3 signaling, such as an RRCReconfiguration message sent via radio resource control (RRC) signaling. In other cases, the sidelink DRX configuration may be sent using, for example, downlink control information (DCI) or a medium access control control element (MAC-CE), which is described in more detail with respect to FIGS. 10A-10C.

Relay user equipment 904B may configure its sidelink DRX cycle based on the sidelink DRX configuration received at step 908.

Flow 900 then proceeds to step 910 with relay user equipments 904A sending an indication that the sidelink DRX configuration is complete to target user equipment 804A. The indication may take many forms. In one example, the indication includes an RRCReconfigurationSidelinkComplete message.

As above, the sidelink DRX configuration for the relay user equipment 904B may ensure it and target user equipment 804A are active during at least a portion of the common on DRX periods, as discussed with respect to FIG. 5, so that target user equipment 804A and relay user equipment 804B may communicate directly on the sidelink communication channel.

Flow 900 then proceeds to step 912 with relay user equipment 904B sending sidelink DRX configuration information to base station 902. The sidelink DRX configuration information may, for example, include the sidelink DRX configurations for both target user equipment 904A and relay user equipment 904B.

Note that no step is shown for target user equipment 904A configuring its own sidelink DRX cycle in FIG. 9. This is because target user equipment 904A may determine the sidelink configuration (sent to relay user equipment 904B in step 908) based on its own existing configuration, so that no reconfiguration is necessary for target user equipment 904A. However, in other cases, target user equipment 904A may reconfigure its own DRX configuration based on, for example, the sidelink DRX preference information received from relay user equipment 904B (if any is received) at step 906.

Relay user equipment 904B may not accept target user equipment 904A's sidelink DRX configuration due to conflicts. For example, relay user equipment 904A may already be configured for other data traffic on the sidelink (e.g., to another target user equipment) and may need another configuration from target user equipment 904A. If relay user equipment 904B does not accept target user equipment 904B's specific sidelink DRX configuration, it may instead send sidelink DRX preference information back to target user equipment 904A after receiving the initial sidelink configuration from target user equipment 904A at step 908. For example, relay user equipment 904B may send a list of its sidelink DRX preference with different priorities to target user equipment 904A, and thereafter target user equipment 904A can adjust relay user equipment 904B's sidelink DRX configuration based on the highest priority option in the list of preferences that is also suitable for target user equipment 904A.

In one example, target user equipment 904A may select a user-equipment-specific sidelink DRX configuration (e.g., a sidelink DRX cycle) autonomously based on an identifier associated with the user equipment, such as a sidelink synchronization identity (SSID) or Layer-2 ID. The network (e.g., base station 902) may determine the number of user equipment-specific slots N, during a common on period, and then user equipments can derive their user equipment-specific on slots based on their own identifier. In one example, a user equipment, such as target user equipment 904A, can use the following expression:

$$\text{UE specific ON slots} = (\text{SSID mod } N) \text{ or } (\text{Layer-2 ID mod } N)$$

Thus, a user equipment can use this equation to get its default sidelink configuration if no sidelink DRX configuration is received from the network.

Thus, FIG. 9 depicts another example of user equipment coordination of sidelink DRX configurations for user equipments—specifically where the target user equipment coordinates for itself and at least one relay user equipment. Note that while FIG. 9 discusses two user equipments (relay and target), in other cases, a user equipment such as target user equipment 904A may coordinate sidelink DRX configurations for any number of relay user equipments in any number of target/relay relationships with each other.

FIGS. 6-9 depict various examples of coordinating sidelink DRX configurations where either the network (e.g., a base station) or a user equipment coordinates the sidelink DRX configurations. However, in other examples, the network and user equipments may both participate in the sidelink DRX configuration.

For example, the network may configure a relay user equipment as depicted and described with respect to FIGS. 6 and 7, but then the relay user equipment may configure the target user equipment as depicted and described with respect to FIG. 8. Other examples are possible.

Figures 10A, 10B, 10C:
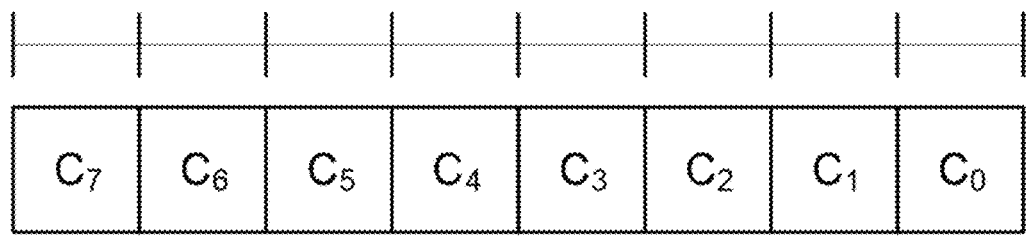
FIGS. 10A-10C depicts various manners for sending sidelink DRX configurations.

FIGS. 10A-10C depicts various manners for sending sidelink DRX configurations.

As described above, sidelink DRX configuration information may be sent via layer 3 signaling, such as RRC signaling, or layer 1 or layer 2 signaling, such as DCI and MAC-CE signaling. A benefit of layer 1 and layer 2 signaling is its lower latency, meaning that configurations may be performed more quickly.

In some examples, layer 1 and layer 2 signaling can be used to signal preconfigured sidelink DRX configurations. In other examples, layer 1 and layer 2 signaling can be used for more dynamic sidelink DRX alignment over the sidelink between relay and target user equipments.

FIG. 10A depicts an example of a system information block (SIB) type 18 for indicating preconfigured sidelink DRX configurations.

In some cases, a network may preconfigure a plurality of sidelink DRX configurations, and inform user equipments of the available options through system information block (SIB) signaling. In one example, the network (e.g., a base station) broadcasts the preconfigured DRX configuration options on a Uu interface using a SIB18 message, as depicted in FIG. 10A, where the "commDRXConfig" field is used to define the preconfigured option.

In such a scenario, all user equipments connected to the network receive the same preconfigured options via the SIB18 message, wherein the commDRXConfig is a set of possible sidelink DRX configurations, each of which is associated with an index. Each user equipment may then use one of the SL DRX configurations in the preconfigured set.

After broadcasting preconfigured DRX configurations using the SIB18 block as in FIG. 10A, the network may then indicate to each user equipment (such as the target and relay user equipments in FIG. 6) which option to select via a user equipment-specific message, such as the SIB19 block in FIG. 10B.

For example, the "DRXInfoList" field in FIG. 10B may include a list of numbers, where each number indicates one option from the set of SL DRX preconfigured options, and each number is associated with a user equipment identifier. Upon receiving the SIB19 block, a user equipment finds its user equipment identifier in the list, and determines its preconfigured sidelink DRX configuration option.

FIG. 10C depicts another method in which a network can inform a user equipment of a sidelink DRX configuration.

In particular, FIG. 10C may represent a downlink control information (DCI) element or a medium access control control element (MAC-CE). In either case, the network may use a number (e.g., an octal number) to indicate one option from the set of sidelink DRX preconfigured options.

For example, where FIG. 10C represents DCI, each DCI element (e.g., $C_0 \ldots C_7$) is dedicated to one user equipment.

Similarly, where FIG. 10C represents a MAC-CE, each MAC-CE element (e.g., $C_0 \ldots C_7$) is dedicated to one user equipment.

Figure 11:
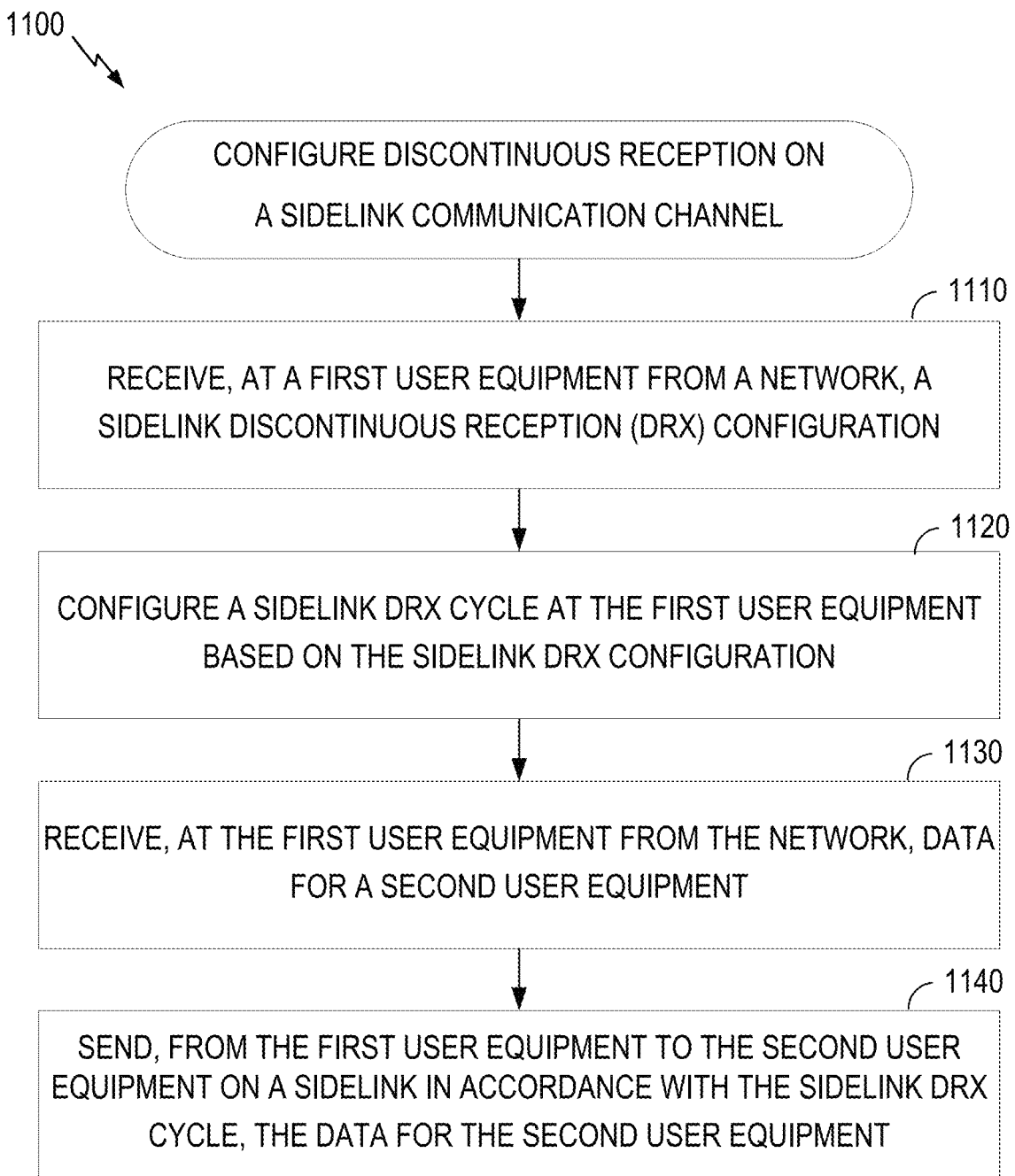
FIG. 11 depicts an example method for configuring discontinuous reception on a sidelink communication channel at a user equipment.

Example Methods of Configuring Discontinuous Reception on a Sidelink Communication Channel FIG. 11 depicts an example method 1100 for configuring discontinuous reception on a sidelink communication channel at a user equipment.

Method 1100 begins at step 1110 with receiving, at a first user equipment from a network, a sidelink discontinuous reception (DRX) configuration.

The sidelink DRX configuration may configure various aspects of a sidelink communication channel. For example, the sidelink DRX configuration may cause the first user equipment and the second user equipment to become active during a common portion of a common sidelink DRX cycle, such as depicted and described in FIG. 5.

The first user equipment may receive the sidelink DRX configuration in various manners. For example, the first user equipment may receive the sidelink DRX configuration via layer 3 signaling, such as radio resource control (RRC) signaling from the network, or via layer 2 and layer 1 signaling, such as downlink control information (DCI) signaling from the network or medium access control control element (MAC-CE) signaling from the network. In some cases, the first user equipment receives the sidelink DRX configuration from the network via a Uu interface.

Method 1100 then proceeds to step 1120 with configuring a sidelink DRX cycle at the first user equipment based on the sidelink DRX configuration.

Method 1100 then proceeds to step 1130 with receiving, at the first user equipment from the network, data for a second user equipment.

The data for the second user equipment may be many sorts of data. For example, the data for the second user equipment may be a paging message. As another example, the data for the second user equipment may be a data packet or other type of message.

Method 1100 then proceeds to step 1140 with sending, from the first user equipment to the second user equipment on a sidelink in accordance with the sidelink DRX cycle, the data for the second user equipment.

The first user equipment may send the data to the second user equipment in various ways. In one example, the first user equipment sends the data to the second user equipment via a PC5 interface on the sidelink.

In some cases, method 1100 may be performed along with additional steps not depicted in FIG. 11.

In some cases, method 1100 may include sending, from the first user equipment to the second user equipment, the sidelink DRX configuration.

In some cases, method 1100 may include sending, from the first user equipment to the network, a sidelink DRX configuration preference for the first user equipment.

In some cases, method 1100 may include: receiving, at the first user equipment from the second user equipment, a sidelink DRX configuration preference for the second user equipment; and sending, from the first user equipment to the network, the sidelink DRX configuration preference for the second user equipment.

In some cases, method 1100 may include: sending, from the first user equipment to the second user equipment on the sidelink, a second sidelink DRX configuration, wherein, the second sidelink DRX configuration is configured to configure a DRX cycle at the second user equipment.

In some cases, method 1100 may include: receiving, at the first user equipment from the second user equipment, a sidelink DRX configuration preference; and sending, from the first user equipment to the second user equipment on the sidelink, a third sidelink DRX configuration, wherein the third sidelink DRX configuration is based on the sidelink DRX configuration preference from the second user equipment.

In some cases, a user equipment (e.g., UE 104 in the wireless communication network 100 of FIG. 1), or a portion thereof, may perform, or be configured, operable, or adapted to perform, operations of method 1100. In some cases, operations of method 1100 may be implemented as software components (e.g., sidelink DRX configuration component 281 of FIG. 2) that are executed and run on one or more processors (e.g., controller/processor 280 of FIG. 2). Signals involved in the operations may be transmitted or received by the UE by one or more antennas (e.g., antennas 252 of FIG. 2), or via a bus interface of one or more processors (e.g., the controller/processor 280) obtaining and/or outputting the signals.

FIG. 11 depicts one example of a method consistent with the disclosure herein, but other examples are possible, which may include additional or alternative steps, or which omit certain steps. The various examples discussed with respect to FIG. 11 are illustrative and not meant to limit the scope of method 1100.

Figure 12:
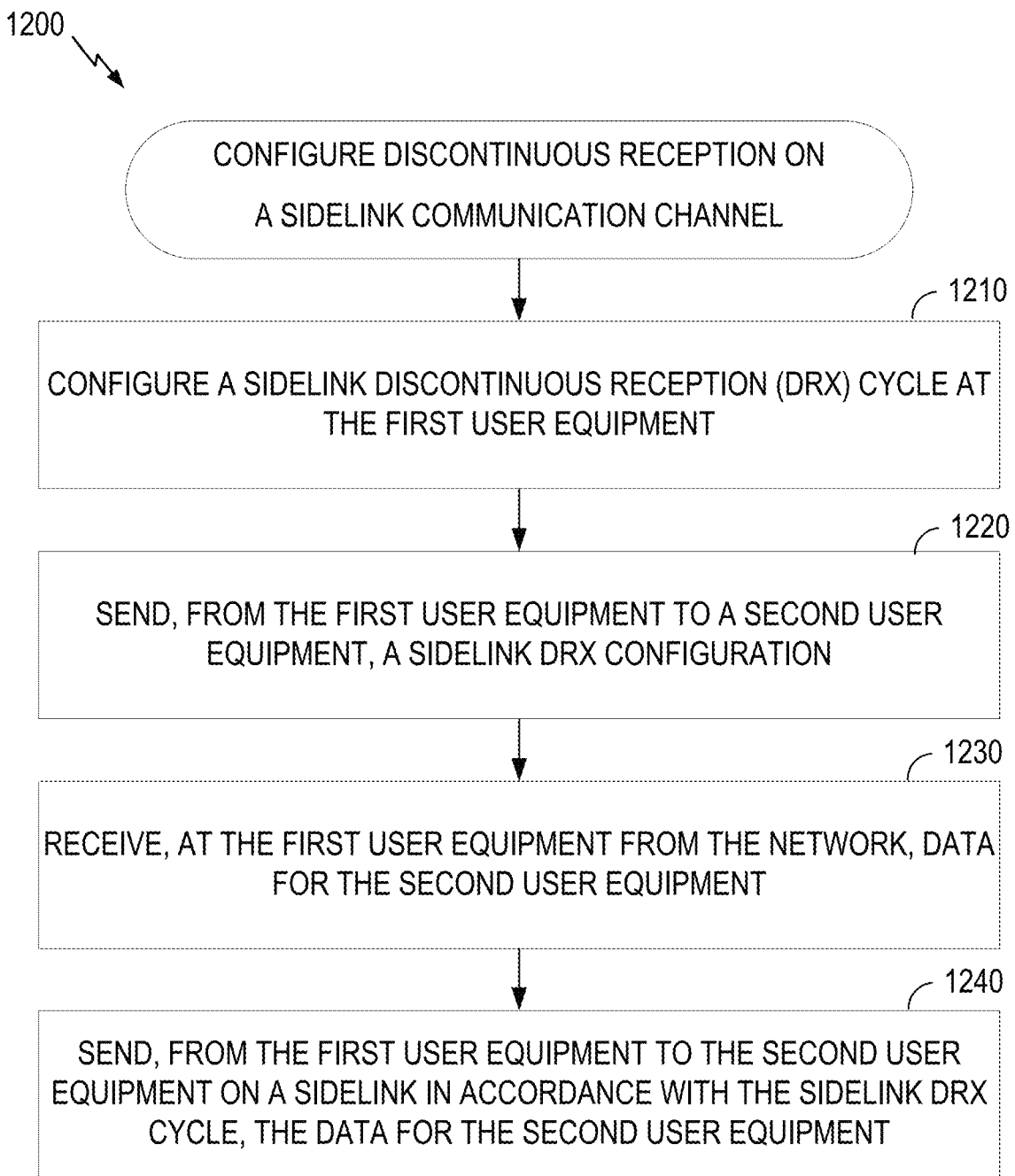
FIG. 12 depicts another example method for configuring discontinuous reception on a sidelink communication channel at a user equipment.

FIG. 12 depicts another example method 1200 for configuring discontinuous reception on a sidelink communication channel at a user equipment.

Method 1200 begins at step 1210 with configuring a sidelink discontinuous reception (DRX) cycle at the first user equipment.

Method 1200 then proceeds to step 1220 with sending, from the first user equipment to a second user equipment, a sidelink DRX configuration.

The sidelink DRX configuration may configure various aspects of a sidelink communication channel. For example, the sidelink DRX configuration may cause the second user equipment and the first user equipment to become active during a common portion of a common sidelink DRX cycle, such as depicted and described in FIG. 5.

The first user equipment may send the data to the second user equipment in various ways. In one example, the first user equipment sends the data to the second user equipment via a PC5 interface on the sidelink.

Method 1200 then proceeds to step 1230 with receiving, at the first user equipment from the network, data for the second user equipment.

The data for the second user equipment may be many sorts of data. For example, the data for the second user equipment may be a paging message. As another example, the data for the second user equipment may be a data packet or other type of message.

Method 1200 then proceeds to step 1240 with sending, from the first user equipment to the second user equipment on a sidelink in accordance with the sidelink DRX cycle, the data for the second user equipment.

In some cases, method 1200 may be performed along with additional steps not depicted in FIG. 12.

In some cases, method 1200 includes receiving, at the first user equipment from the second user equipment, a message indicating that the second user equipment has configured its sidelink DRX cycle according to the sidelink DRX configuration.

In some cases, method 1200 includes: receiving, at the first user equipment from the second user equipment, a sidelink DRX configuration preference for the second user equipment; and generating the sidelink DRX configuration based on the sidelink DRX configuration preference from the second user equipment.

In some cases, method 1200 includes: receiving, at the first user equipment from the second user equipment, a sidelink DRX configuration preference for the second user equipment; and sending, from the first user equipment to the second user equipment, a second sidelink DRX configuration based on the sidelink DRX configuration preference from the second user equipment.

The sidelink DRX configuration preference may include various information. In one example, the sidelink DRX configuration preference comprises a plurality of sidelink DRX configuration options in an ordered list by preference of the second user equipment. In another example, the sidelink DRX configuration preference may include a single preferred DRX configuration option of the second user equipment. Other examples are possible.

In some cases, method 1200 includes: sending, from the first user equipment to the network, sidelink DRX configuration information comprising the sidelink DRX configuration for the first user equipment and a sidelink DRX configuration for the second user equipment.

In some cases, a user equipment (e.g., UE 104 in the wireless communication network 100 of FIG. 1), or a portion thereof, may perform, or be configured, operable, or adapted to perform, operations of method 1200. In some cases, operations of method 1200 may be implemented as software components (e.g., sidelink DRX configuration component 281 of FIG. 2) that are executed and run on one or more processors (e.g., controller/processor 280 of FIG. 2). Signals involved in the operations may be transmitted or received by the UE by one or more antennas (e.g., antennas 252 of FIG. 2), or via a bus interface of one or more processors (e.g., the controller/processor 280) obtaining and/or outputting the signals.

FIG. 12 depicts one example of a method consistent with the disclosure herein, but other examples are possible, which may include additional or alternative steps, or which omit certain steps. The various examples discussed with respect to FIG. 12 are illustrative and not meant to limit the scope of method 1200.

Figure 13:
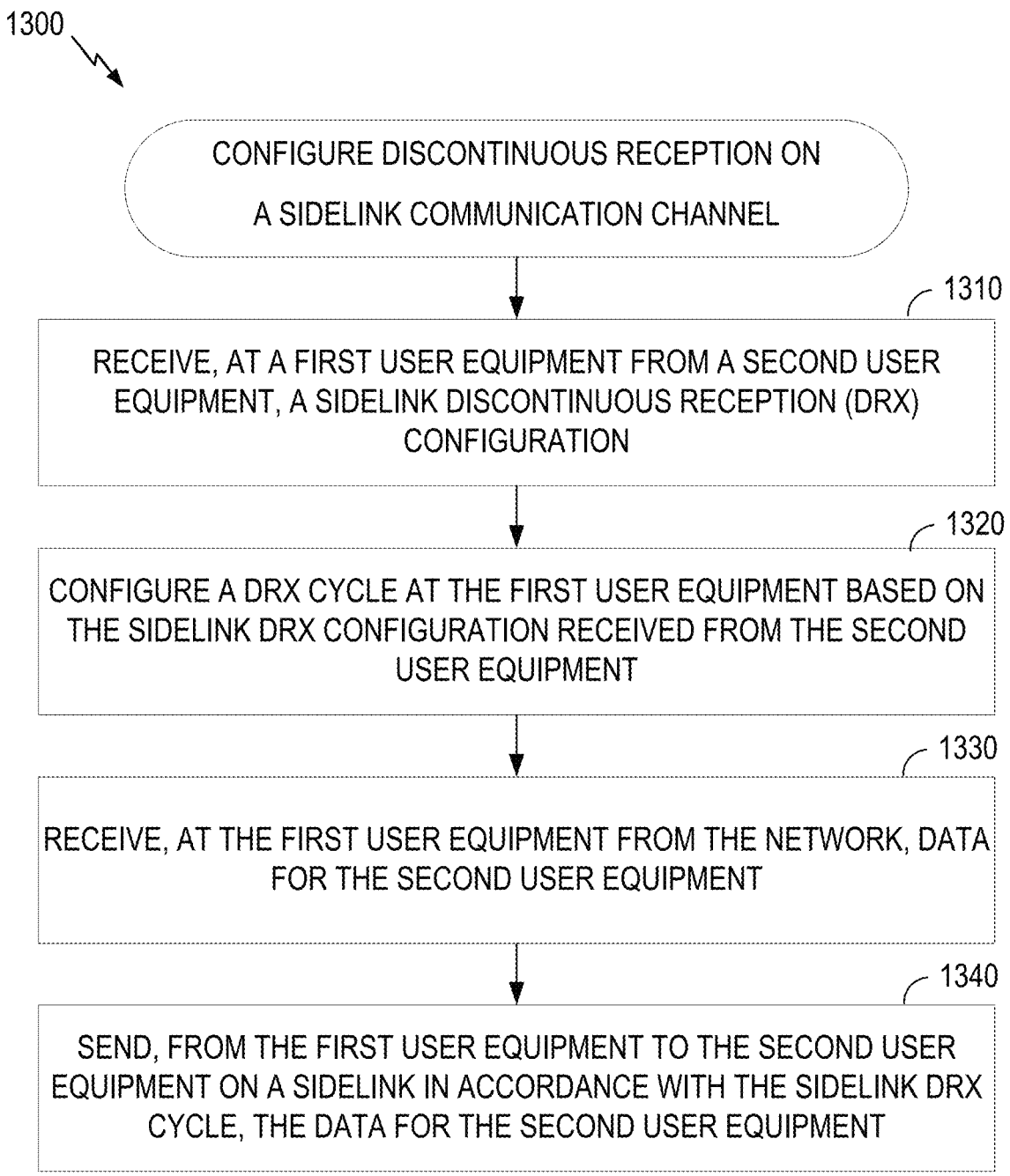
FIG. 13 depicts another example method for configuring discontinuous reception on a sidelink communication channel at a user equipment.

FIG. 13 depicts another example method 1300 for configuring discontinuous reception on a sidelink communication channel at a user equipment.

Method 1300 begins at step 1310 with receiving, at a first user equipment from a second user equipment, a sidelink discontinuous reception (DRX) configuration.

The sidelink DRX configuration may configure various aspects of a sidelink communication channel. For example, the sidelink DRX configuration may cause the first user equipment and the second user equipment to become active during a common portion of a common sidelink DRX cycle, such as depicted and described in FIG. 5.

Method 1300 then proceeds to step 1320 with configuring a DRX cycle at the first user equipment based on the sidelink DRX configuration received from the second user equipment.

Method 1300 then proceeds to step 1330 with receiving, at the first user equipment from the network, data for the second user equipment.

The data for the second user equipment may be many sorts of data. For example, the data for the second user equipment may be a paging message. As another example, the data for the second user equipment may be a data packet or other type of message.

Method 1300 then proceeds to step 1340 with sending, from the first user equipment to the second user equipment on a sidelink in accordance with the sidelink DRX cycle, the data for the second user equipment.

The first user equipment may send the data to the second user equipment in various ways. In one example, the first user equipment sends the data to the second user equipment via a PC5 interface on the sidelink.

In some cases, method 1300 may be performed along with additional steps not depicted in FIG. 13.

In some cases, method 1300 includes sending, from the first user equipment to the second user equipment, a message indicating that the first user equipment has configured its sidelink DRX cycle according to the sidelink DRX configuration.

In some cases, method 1300 includes sending, from the first user equipment to the second user equipment, a sidelink DRX configuration preference for the first user equipment.

The sidelink DRX configuration preference may include various information. In one example, the sidelink DRX configuration preference comprises a plurality of sidelink DRX configuration options in an ordered list by preference of the first user equipment. In another example, the sidelink DRX configuration preference may include a single preferred DRX configuration option of the first user equipment. Other examples are possible.

In some cases, the sidelink DRX configuration received at the first user equipment from the second user equipment is based on the sidelink DRX configuration preference from the first user equipment.

In some cases, a user equipment (e.g., UE 104 in the wireless communication network 100 of FIG. 1), or a portion thereof, may perform, or be configured, operable, or adapted to perform, operations of method 1300. In some cases, operations of method 1300 may be implemented as software components (e.g., sidelink DRX configuration component 281 of FIG. 2) that are executed and run on one or more processors (e.g., controller/processor 280 of FIG. 2). Signals involved in the operations may be transmitted or received by the UE by one or more antennas (e.g., antennas 252 of FIG. 2), or via a bus interface of one or more processors (e.g., the controller/processor 280) obtaining and/or outputting the signals.

FIG. 13 depicts one example of a method consistent with the disclosure herein, but other examples are possible, which may include additional or alternative steps, or which omit certain steps. The various examples discussed with respect to FIG. 13 are illustrative and not meant to limit the scope of method 1300.

Figure 14:
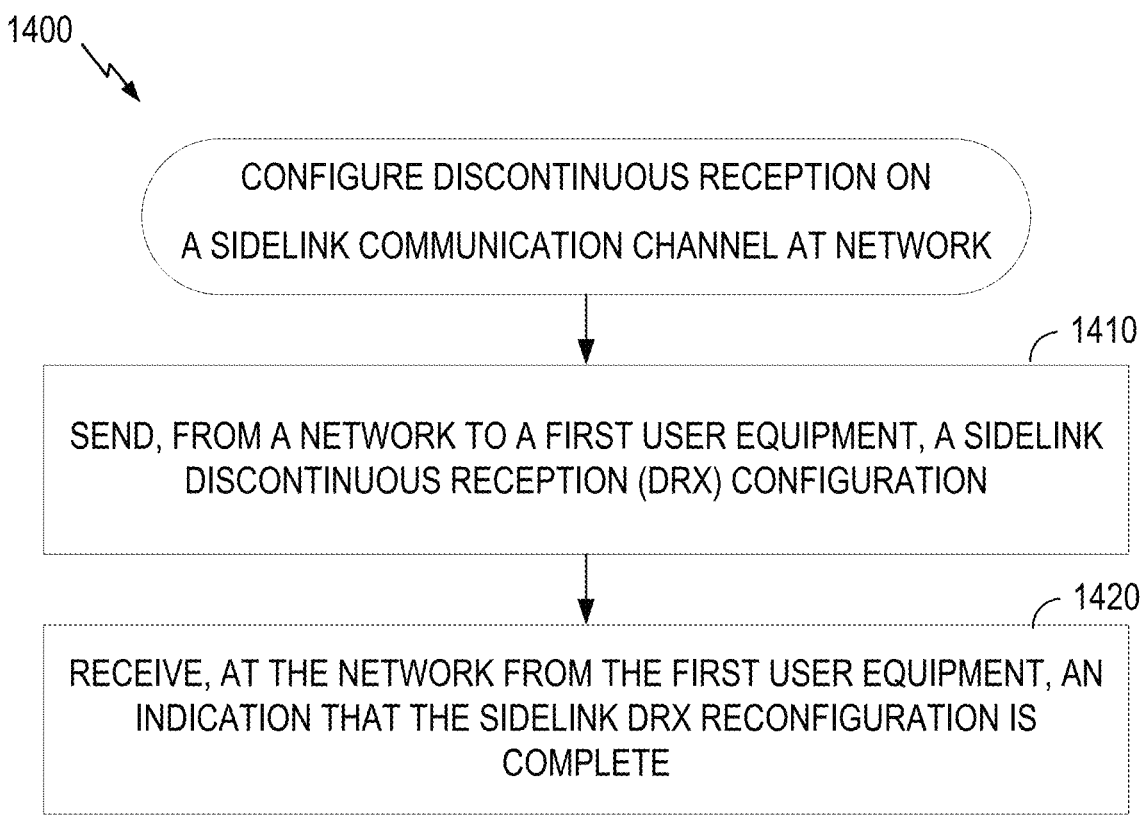
FIG. 14 depicts another example method for configuring discontinuous reception on a sidelink communication channel at a network.

FIG. 14 depicts another example method 1400 for configuring discontinuous reception on a sidelink communication channel at a network.

Method 1400 begins at step 1410 with sending, from a network to a first user equipment, a sidelink discontinuous reception (DRX) configuration.

The network may send the sidelink DRX configuration in various ways. In one example, the network sends the sidelink DRX configuration via a Uu interface.

The sidelink DRX configuration may include various information. In one example, the sidelink DRX configuration includes a sidelink DRX configuration for the first user equipment and a sidelink DRX configuration for a second user equipment.

The sidelink DRX configuration may configure various aspects of a sidelink communication channel. For example, the sidelink DRX configuration may cause the first user equipment and the second user equipment to become active during a common portion of a common sidelink DRX cycle, such as depicted and described in FIG. 5.

Method 1400 then proceeds to step 1420 with receiving, at the network from the first user equipment, an indication that the sidelink DRX reconfiguration is complete.

The network may receive the indication that the sidelink DRX reconfiguration is complete in various ways. In one example, the network receives the indication that the sidelink DRX reconfiguration is complete via a Uu interface.

The indication that the sidelink DRX reconfiguration is complete may include various information. In one example, the indication that the sidelink DRX reconfiguration is complete includes an indication that the sidelink DRX configuration is complete for one or more of the first user equipment and a second user equipment. In some cases, the indication that the sidelink DRX reconfiguration is complete comprises a radio resource control (RRC) reconfiguration complete message.

In some cases, method 1400 may be performed along with additional steps not depicted in FIG. 14.

In some cases, method 1400 includes receiving a sidelink DRX configuration preference from the first user equipment.

The sidelink DRX configuration preference may include various information. In one example, the sidelink DRX configuration preference comprises a plurality of sidelink DRX configuration options in an ordered list by preference of one or more of the first user equipment and/or the second user equipment. In another example, the sidelink DRX configuration preference may include a single preferred DRX configuration option of one or more of the first user equipment and the second user equipment. Other examples are possible.

In some cases, a base station (e.g., such as base station 102 in the wireless communication network 100 of FIG. 1), or a portion thereof, may perform, or be configured, operable, or adapted to perform, operations of method 1400. In some cases, operations of method 1400 may be implemented as software components (e.g., sidelink DRX configuration component 241 of FIG. 2) that are executed and run on one or more processors (e.g., controller/processor 240 of FIG. 2). Signals involved in the operations may be transmitted or received by the base station by one or more antennas (e.g., antennas 234 of FIG. 2), or via a bus interface of one or more processors (e.g., the controller/processor 240) obtaining and/or outputting the signals.

FIG. 14 depicts one example of a method consistent with the disclosure herein, but other examples are possible, which may include additional or alternative steps, or which omit certain steps. The various examples discussed with respect to FIG. 14 are illustrative and not meant to limit the scope of method 1400.

Figure 15:
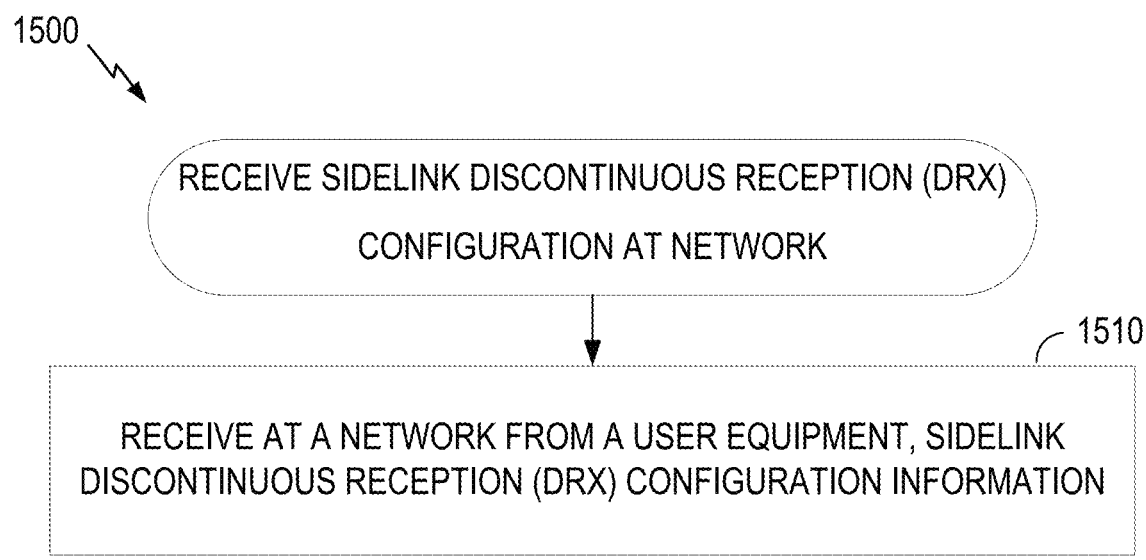
FIG. 15 depicts an example method for receiving a sidelink discontinuous reception configuration at a network.

FIG. 15 depicts an example method 1500 for receiving a sidelink discontinuous reception (DRX) configuration at a network.

Method 1500 begins at step 1510 with receiving at a network from a user equipment, sidelink discontinuous reception (DRX) configuration information.

The sidelink DRX configuration information may include various information. In one example, the sidelink DRX configuration information includes a sidelink DRX configuration for a first user equipment and a sidelink DRX configuration for a second user equipment.

The sidelink DRX configuration for the first user equipment and/or second user equipment may configure various aspects of a sidelink communication channel. For example, the sidelink DRX configuration may cause the first user equipment and the second user equipment to become active during a common portion of a common sidelink DRX cycle, such as depicted and described in FIG. 5.

The network may receive the sidelink DRX configuration information in various manners. In one example, then network receives the sidelink DRX configuration information via a Uu interface.

In some cases, a base station (e.g., such as base station 102 in the wireless communication network 100 of FIG. 1), or a portion thereof, may perform, or be configured, operable, or adapted to perform, operations of method 1500. In some cases, operations of method 1500 may be implemented as software components (e.g., sidelink DRX configuration component 241 of FIG. 2) that are executed and run on one or more processors (e.g., controller/processor 240 of FIG. 2). Signals involved in the operations may be transmitted or received by the base station by one or more antennas (e.g., antennas 234 of FIG. 2), or via a bus interface of one or more processors (e.g., the controller/processor 240) obtaining and/or outputting the signals.

FIG. 15 depicts one example of a method consistent with the disclosure herein, but other examples are possible, which may include additional or alternative steps, or which omit certain steps. The various examples discussed with respect to FIG. 15 are illustrative and not meant to limit the scope of method 1400.

Example Wireless Communication Devices

Figure 16:
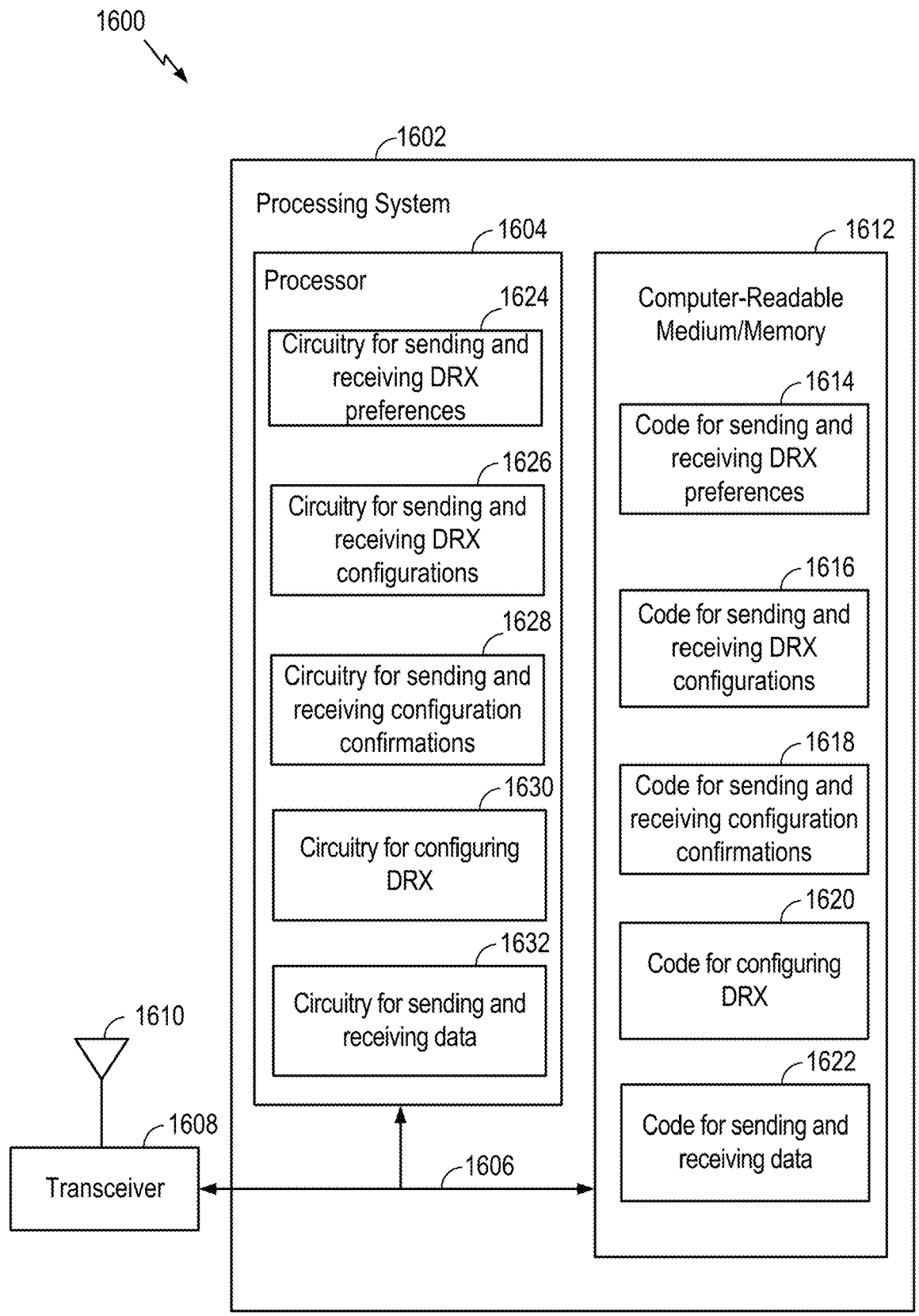
FIG. 16 depicts aspects of an example communications device.

FIG. 16 depicts an example communications device 1600 that includes various components operable, configured, or adapted to perform operations for the techniques disclosed herein, such as the operations depicted and described with respect to FIGS. 6-13. In some examples, communication device 1600 may be a UE 104 as described, for example with respect to FIGS. 1 and 2.

Communications device 1600 includes a processing system 1602 coupled to a transceiver 1608 (e.g., a transmitter and/or a receiver). Transceiver 1608 is configured to transmit (or send) and receive signals for the communications device 1600 via an antenna 1610, such as the various signals as described herein. Processing system 1602 may be configured to perform processing functions for communications device 1600, including processing signals received and/or to be transmitted by communications device 1600.

Processing system 1602 includes a processor 1604 coupled to a computer-readable medium/memory 1612 via a bus 1606. In certain aspects, computer-readable medium/memory 1612 is configured to store instructions (e.g., computer-executable code) that when executed by processor 1604, cause processor 1604 to perform the operations illustrated in FIGS. 6-13, or other operations for performing the various techniques discussed herein for sidelink DRX configuration.

In the depicted example, computer-readable medium/memory 1612 stores code 1614 for sending and receiving sidelink DRX preference information, code 1616 for sending and receiving sidelink DRX configurations, code 1618 for sending and receiving DRX configuration confirmations, code 1620 for configuring sidelink DRX, and code 1622 for sending and receiving data.

In the depicted example, processor 1604 has circuitry configured to implement the code stored in the computer-readable medium/memory 1612, including circuitry 1624 for sending and receiving sidelink DRX preference information, circuitry 1626 for sending and receiving sidelink DRX configurations, circuitry 1628 for sending and receiving DRX configuration confirmations, circuitry 1630 for configuring sidelink DRX, and circuitry 1632 for sending and receiving data.

Various components of communications device 1600 may provide means for performing the methods described herein, including with respect to FIGS. 6-13.

In some examples, means for transmitting or sending (or means for outputting for transmission) may include the transceivers 254 and/or antenna(s) 252 of the UE 104 illustrated in FIG. 2 and/or transceiver 1608 and antenna 1610 of the communication device 1600 in FIG. 16.

In some examples, means for receiving (or means for obtaining) may include the transceivers 254 and/or antenna(s) 252 of the UE 104 illustrated in FIG. 2 and/or transceiver 1608 and antenna 1610 of the communication device 1600 in FIG. 16.

In some examples, means for configuring sidelink DRX, means for determining sidelink DRX preferences, means for generating configuration confirmations, and means for processing received data may include a processing system, which may include one or more processors, such as the receive processor 258, the transmit processor 264, the TX MIMO processor 266, and/or the controller/processor 280, including sidelink DRX configuration component 281, of the UE 104 illustrated in FIG. 2 and/or the processing system 1602 of the communication device 1600 in FIG. 16.

Notably, FIG. 16 is just use example, and many other examples and configurations of communication device 1600 are possible.

Figure 17:
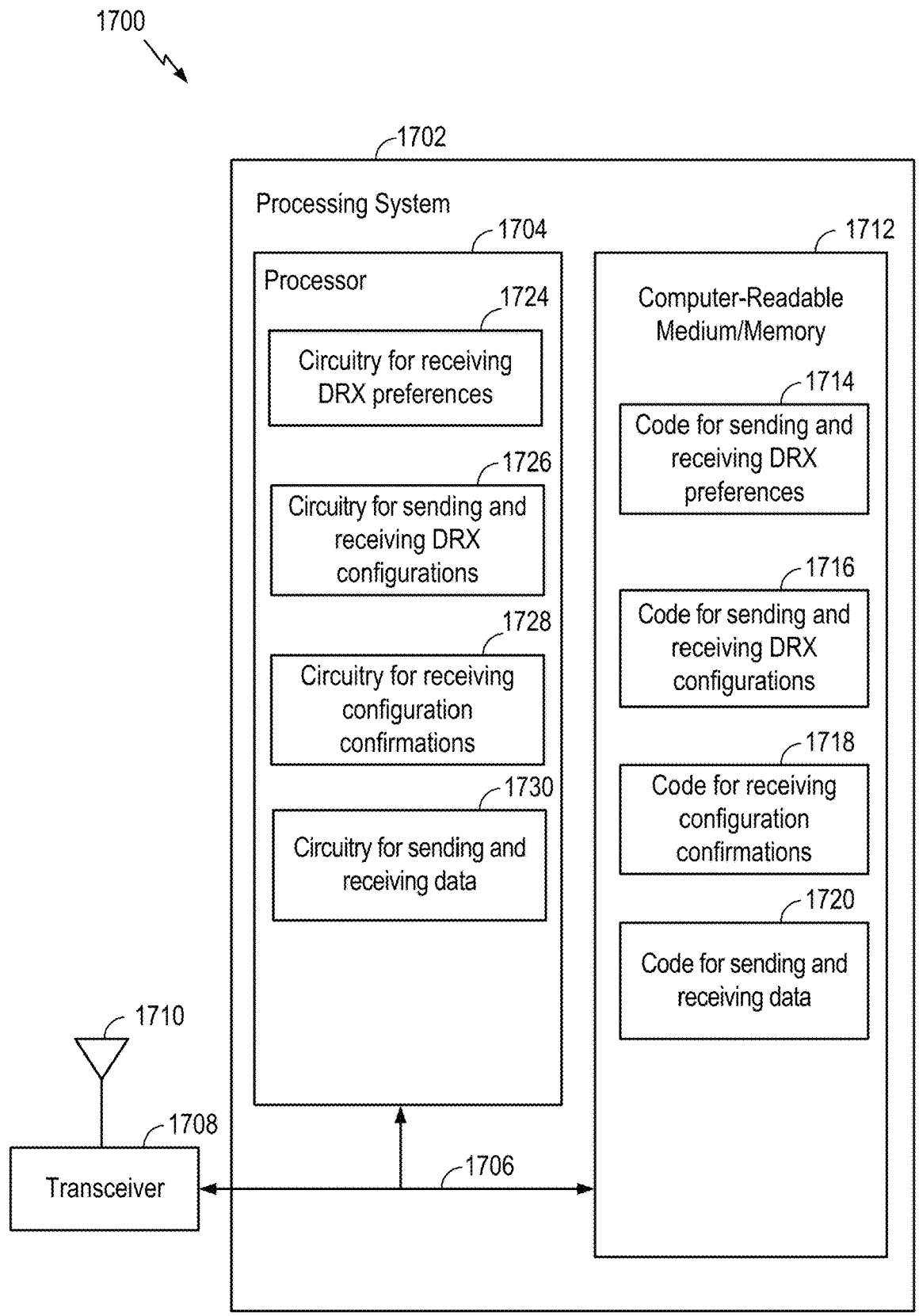
FIG. 17 depicts aspects of another example communications device.

FIG. 17 depicts aspects of another example communications device 1700 that includes various components operable, configured, or adapted to perform operations for the techniques disclosed herein, such as the operations depicted and described with respect to FIGS. 6-10 and 14-15. In some examples, communication device 1700 may be a base station 102 as described, for example with respect to FIGS. 1 and 2.

Communications device 1700 includes a processing system 1702 coupled to a transceiver 1708 (e.g., a transmitter and/or a receiver). Transceiver 1708 is configured to transmit (or send) and receive signals for the communications device 1700 via an antenna 1710, such as the various signals as described herein. Processing system 1702 may be configured to perform processing functions for communications device 1700, including processing signals received and/or to be transmitted by communications device 1700.

Processing system 1702 includes a processor 1704 coupled to a computer-readable medium/memory 1712 via a bus 1706. In certain aspects, computer-readable medium/memory 1712 is configured to store instructions (e.g., computer-executable code) that when executed by processor 1704, cause processor 1704 to perform the operations illustrated in FIGS. 6-10 and 14-15, or other operations for performing the various techniques discussed herein for sidelink DRX configuration.

In the depicted example, computer-readable medium/memory 1712 stores code 1714 for sending and receiving sidelink DRX preference information, code 1716 for sending and receiving sidelink DRX configurations, code 1718 for receiving DRX configuration confirmations, and code 1720 for sending and receiving data.

In the depicted example, processor 1704 has circuitry configured to implement the code stored in the computer-readable medium/memory 1712, including: circuitry 1724 for receiving sidelink DRX preference information, circuitry 1726 for sending and receiving sidelink DRX configurations, circuitry 1728 for receiving DRX configuration confirmations, and circuitry 1730 for sending and receiving data.

Various components of communications device 1700 may provide means for performing the methods described herein, including with respect to FIGS. 6-10 and 14-15.

In some examples, means for transmitting or sending (or means for outputting for transmission) may include the transceivers 232 and/or antenna(s) 234 of the base station 102 illustrated in FIG. 2 and/or transceiver 1708 and antenna 1710 of the communication device 1700 in FIG. 17.

In some examples, means for receiving (or means for obtaining) may include the transceivers 232 and/or antenna(s) 234 of the base station 102 illustrated in FIG. 2 and/or transceiver 1708 and antenna 1710 of the communication device 1700 in FIG. 17.

In some examples, means for determining sidelink DRX preferences, means for determining sidelink DRX configurations, and means for processing received data may include a processing system, which may include one or more processors, such as the receive processor 238, the transmit processor 220, the TX MIMO processor 230, and/or the controller/processor 240, including sidelink DRX configuration 241, of the base station 102 illustrated in FIG. 2 and/or the processing system 1702 of the communication device 1700 in FIG. 17.

Notably, FIG. 17 is just use example, and many other examples and configurations of communication device 1700 are possible.

Example Clauses

Implementation examples are described in the following numbered clauses:

Clause 1: A method of wireless communications, comprising: receiving, at a first user equipment from a network, a sidelink discontinuous reception (DRX) configuration; configuring a sidelink DRX cycle at the first user equipment based on the sidelink DRX configuration; receiving, at the first user equipment from the network, data for a second user equipment; and sending, from the first user equipment to the second user equipment on a sidelink in accordance with the sidelink DRX cycle, the data for the second user equipment.

Clause 2: The method of Clause 1, further comprising sending, from the first user equipment to the second user equipment, the sidelink DRX configuration.

Clause 3: The method of Clause 1, further comprising sending, from the first user equipment to the network, a sidelink DRX configuration preference for the first user equipment.

Clause 4: The method of any one of Clauses 1-2, further comprising: receiving, at the first user equipment from the second user equipment, a sidelink DRX configuration preference for the second user equipment; and sending, from the first user equipment to the network, the sidelink DRX configuration preference for the second user equipment.

Clause 5: The method of any one of Clauses 1-4, wherein the sidelink DRX configuration is configured to cause the first user equipment and the second user equipment to become active during a common portion of a common sidelink DRX cycle.

Clause 6: The method of any one of Clauses 1-5, wherein the first user equipment receives the sidelink DRX configuration via radio resource control (RRC) signaling from the network.

Clause 7: The method of any one of Clauses 1-5, wherein the first user equipment receives the sidelink DRX configuration via downlink control information (DCI) signaling from the network.

Clause 8: The method of any one of Clauses 1-5, wherein the first user equipment receives the sidelink DRX configuration via medium access control control element (MAC-CE) signaling from the network.

Clause 9: The method of Clauses 1-8, wherein the data for the second user equipment comprises a data packet or a paging message.

Clause 10: The method of any one of Clauses 1-9, wherein: the first user equipment receives the sidelink DRX configuration from the network via a Uu interface, and the first user equipment sends the data to the second user equipment via a PC5 interface on the sidelink.

Clause 11: The method of Clause 1, further comprising: sending, from the first user equipment to the second user equipment on the sidelink, a second sidelink DRX configuration, wherein, the second sidelink DRX configuration is configured to configure a DRX cycle at the second user equipment.

Clause 12: The method of Clause 11, further comprising: receiving, at the first user equipment from the second user equipment, a sidelink DRX configuration preference; and sending, from the first user equipment to the second user equipment on the sidelink, a third sidelink DRX configuration, wherein the third sidelink DRX configuration is based on the sidelink DRX configuration preference from the second user equipment.

Clause 13: The method of Clause 12, wherein the sidelink DRX configuration preference comprises a plurality of sidelink DRX configuration options.

Clause 14: The method of Clause 13, wherein the plurality of sidelink DRX configurations options are in an ordered list by preference of the second user equipment.

Clause 15: A method of wireless communications, comprising: configuring a sidelink discontinuous reception (DRX) cycle at the first user equipment; sending, from the first user equipment to a second user equipment, a sidelink DRX configuration; receiving, at the first user equipment from the network, data for the second user equipment; and sending, from the first user equipment to the second user equipment on a sidelink in accordance with the sidelink DRX cycle, the data for the second user equipment.

Clause 16: The method of Clause 15, further comprising receiving, at the first user equipment from the second user equipment, a message indicating that the second user equipment has configured its sidelink DRX cycle according to the sidelink DRX configuration.

Clause 17: The method of Clause 15, further comprising: receiving, at the first user equipment from the second user equipment, a sidelink DRX configuration preference for the second user equipment; and generating the sidelink DRX configuration based on the sidelink DRX configuration preference from the second user equipment.

Clause 18: The method of Clause 17, wherein the sidelink DRX configuration preference comprises a plurality of sidelink DRX configuration options in an ordered list by preference of the second user equipment.

Clause 19: The method of any one of Clauses 15-18, further comprising: receiving, at the first user equipment from the second user equipment, a sidelink DRX configuration preference for the second user equipment; and sending, from the first user equipment to the second user equipment, a second sidelink DRX configuration based on the sidelink DRX configuration preference from the second user equipment.

Clause 20: The method of Clause 19, wherein the sidelink DRX configuration preference comprises a plurality of sidelink DRX configuration options in an ordered list by preference of the second user equipment.

Clause 21: The method of any one of Clauses 15-20, wherein the data for the second user equipment comprises a data packet or a paging message.

Clause 22: The method of any one of Clauses 15-21, further comprising sending, from the first user equipment to the network, sidelink DRX configuration information comprising the sidelink DRX configuration for the first user equipment and a sidelink DRX configuration for the second user equipment.

Clause 23: The method of any one of Clauses 15-22, wherein the first user equipment sends the data to the second user equipment via a PC5 interface on the sidelink.

Clause 24: A method of wireless communications, comprising: receiving, at a first user equipment from a second user equipment, a sidelink discontinuous reception (DRX) configuration; configuring a DRX cycle at the first user equipment based on the sidelink DRX configuration received from the second user equipment; receiving, at the first user equipment from the network, data for the second user equipment; and sending, from the first user equipment to the second user equipment on a sidelink in accordance with the sidelink DRX cycle, the data for the second user equipment.

Clause 25: The method of Clause 24, further comprising sending, from the first user equipment to the second user equipment, a message indicating that the first user equipment has configured its sidelink DRX cycle according to the sidelink DRX configuration.

Clause 26: The method of Clause 24, further comprising sending, from the first user equipment to the second user equipment, a sidelink DRX configuration preference for the first user equipment.

Clause 27: The method of Clause 26, wherein the sidelink DRX configuration preference comprises a plurality of sidelink DRX configuration options in an ordered list by preference of the first user equipment.

Clause 28: The method of Clause 24, wherein the sidelink DRX configuration received at the first user equipment from the second user equipment is based on the sidelink DRX configuration preference from the first user equipment.

Clause 29: The method of any one of Clauses 24-28, wherein the data for the second user equipment comprises a data packet or paging message.

Clause 30: The method of any one of Clauses 24-29, wherein the first user equipment sends the data to the second user equipment via a PC5 interface on the sidelink.

Clause 31: A method of wireless communications, comprising: sending, from a network to a first user equipment, a sidelink discontinuous reception (DRX) configuration; and receiving, at the network from the first user equipment, an indication that the sidelink DRX reconfiguration is complete.

Clause 32: The method of Clause 31, wherein the sidelink DRX configuration includes a sidelink DRX configuration for the first user equipment and a sidelink DRX configuration for a second user equipment.

Clause 33: The method of any one of Clauses 31-32, wherein the indication that the sidelink DRX reconfiguration is complete includes an indication that the sidelink DRX configuration is complete for one or more of the first user equipment and the second user equipment.

Clause 34: The method of any one of Clauses 31-33, wherein the indication that the sidelink DRX reconfiguration is complete comprises an radio resource control (RRC) reconfiguration complete message.

Clause 35: The method of any one of Clauses 31-34, further comprising receiving a sidelink DRX preference from the first user equipment.

Clause 36: The method of Clause 35, wherein the sidelink DRX preference comprises a plurality of sidelink DRX configuration options for one or both of the first user equipment and the second user equipment.

Clause 37: The method of Clause 36, wherein the plurality of sidelink DRX configurations options are in an ordered list by preference.

Clause 38: The method of any one of Clauses 31-37, wherein sending, from the network to the first user equipment, the sidelink DRX configuration, and receiving, at the network from the first user equipment, the indication that the sidelink DRX reconfiguration is complete, is performed over a Uu interface between the first user equipment and the network.

Clause 39: A method of wireless communications, comprising receiving at a network from a user equipment, sidelink discontinuous reception (DRX) configuration information.

Clause 40: The method of claim 39, wherein the sidelink DRX configuration information comprises a sidelink DRX configuration for a first user equipment and a sidelink DRX configuration for a second user equipment.

Clause 41: The method of any one of Clauses 39-40, wherein then network receives the sidelink DRX configuration information via a Uu interface.

Clause 42: An apparatus, comprising: a memory comprising computer-executable instructions; one or more processors configured to execute the computer-executable instructions and cause the processing system to perform a method in accordance with any one of Clauses 1-41.

Clause 43: An apparatus, comprising means for performing a method in accordance with any one of Clauses 1-41.

Clause 44: A non-transitory computer-readable medium comprising computer-executable instructions that, when executed by one or more processors of a processing system, cause the processing system to perform a method in accordance with any one of Clauses 1-41.

Clause 42: A computer program product embodied on a computer-readable storage medium comprising code for performing a method in accordance with any one of Clauses 1-41.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS or a home BS.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with core network 190 through second backhaul links 184. Base stations 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

Antennas 252, processors 266, 258, 264, and/or controller/processor 280 of UE 104 and/or antennas 234, processors 220, 230, 238, and/or controller/processor 240 of BS 102 may be used to perform the various techniques and methods described herein.

For example, as shown in FIG. 2, the controller/processor 240 of the BS 102 has a sidelink DRX configuration component 241 that may be configured to coordinate sidelink DRX configurations, according to aspects described herein. As shown in FIG. 2, the controller/processor 280 of the UE 104 has a sidelink DRX configuration component 281 that may be configured to coordinate sidelink DRX configurations, according to aspects described herein. Although shown at the controller/processor, other components of UE 104 and BS 102 may be used to perform the operations described herein.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of sidelink DRX configuration in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor).

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 6-15.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, and others), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated herein. Various modifications, changes and variations may be made in the arrangement, operation, and details of the methods and apparatus described herein.

The invention claimed is:

1. A method of wireless communications, comprising:
   receiving, at a first user equipment from a network, a first sidelink discontinuous reception (DRX) configuration;
   configuring a sidelink DRX cycle at the first user equipment based on the first sidelink DRX configuration;
   receiving, at the first user equipment from the network, data for a second user equipment; and
   sending, from the first user equipment to the second user equipment on a sidelink in accordance with the first sidelink DRX cycle, the data for the second user equipment;
   sending, from the first user equipment to the second user equipment on the sidelink, the first sidelink DRX configuration, wherein the first sidelink DRX configuration is configured to configure a DRX cycle at the second user equipment;
   receiving, at the first user equipment from the second user equipment, a sidelink DRX configuration preference; and
   sending, from the first user equipment to the second user equipment on the sidelink, a second sidelink DRX configuration based on the sidelink DRX configuration preference from the second user equipment.

2. The method of claim 1, further comprising sending, from the first user equipment to the network, a sidelink DRX configuration preference for the first user equipment.

3. The method of claim 1, further comprising:
   sending, from the first user equipment to the network, the sidelink DRX configuration preference for the second user equipment.

4. The method of claim 1, wherein the first sidelink DRX configuration is configured to cause the first user equipment and the second user equipment to become active during a common portion of a common sidelink DRX cycle.

5. The method of claim 1, wherein the first user equipment receives the first sidelink DRX configuration via radio resource control (RRC) signaling from the network.

6. The method of claim 1, wherein the first user equipment receives the first sidelink DRX configuration via downlink control information (DCI) signaling from the network.

7. The method of claim 1, wherein the first user equipment receives the first sidelink DRX configuration via medium access control control element (MAC-CE) signaling from the network.

8. The method of claim 1, wherein the data for the second user equipment comprises a paging message.

9. The method of claim 1, wherein:
   the first user equipment receives the first sidelink DRX configuration from the network via a Uu interface, and
   the first user equipment sends the data to the second user equipment via a PC5 interface on the sidelink.

10. The method of claim 1, wherein the sidelink DRX configuration preference comprises a plurality of sidelink DRX configuration options.

11. The method of claim 10, wherein the plurality of sidelink DRX configurations options are in an ordered list by preference of the second user equipment.

12. An apparatus, comprising:
    a memory comprising executable instructions; and
    one or more processors configured to execute the executable instructions and cause the apparatus to:
    receive a sidelink discontinuous reception (DRX) configuration from a network;
    configure a sidelink DRX cycle based on the first sidelink DRX configuration;
    receive data for a user equipment from the network; and
    send the data for the user equipment to the user equipment on a sidelink in accordance with the first sidelink DRX cycle;
    send, to the user equipment on the sidelink, the first sidelink DRX configuration, wherein the first sidelink DRX configuration is configured to configure a DRX cycle at the user equipment;

receive, from the user equipment, a sidelink DRX configuration preference; and send, to the user equipment on the sidelink, a second sidelink DRX configuration based on the sidelink DRX configuration preference from the user equipment.

13. The apparatus of claim 12, wherein the one or more processors are further configured to cause the apparatus to send a sidelink DRX configuration preference for the apparatus to the network.

14. The apparatus of claim 12, wherein the one or more processors are further configured to cause the apparatus to:
send the sidelink DRX configuration preference for the user equipment to the network.

15. The apparatus of claim 12, wherein the first sidelink DRX configuration is configured to cause the apparatus and the user equipment to become active during a common portion of a common sidelink DRX cycle.

16. The apparatus of claim 12, wherein the one or more processors are further configured to cause the apparatus to receive the first sidelink DRX configuration via radio resource control (RRC) signaling from the network.

17. The apparatus of claim 12, wherein the one or more processors are further configured to cause the apparatus to receive the first sidelink DRX configuration via downlink control information (DCI) signaling from the network.

18. The apparatus of claim 12, wherein the one or more processors are further configured to cause the apparatus to receive the first sidelink DRX configuration via medium access control control element (MAC-CE) signaling from the network.

19. The apparatus of claim 12, wherein the data for the user equipment comprises a paging message.

20. The apparatus of claim 12, wherein the one or more processors are further configured to cause the apparatus to:
receive the first sidelink DRX configuration from the network via a Uu interface, and
send the data to the user equipment via a PC5 interface on the sidelink.

21. The apparatus of claim 12, wherein the sidelink DRX configuration preference comprises a plurality of sidelink DRX configuration options.

22. The apparatus of claim 21, wherein the plurality of sidelink DRX configurations options are in an ordered list by preference of the user equipment.

23. A non-transitory computer-readable medium storing code that, when executed by one or more processors of an apparatus, cause the apparatus to:
receive a sidelink discontinuous reception (DRX) configuration from a network;
configure a sidelink DRX cycle based on the sidelink DRX configuration;
receive data for a user equipment from the network; and
send the data for the user equipment on a sidelink in accordance with the first sidelink DRX cycle;
send, to the user equipment on the sidelink, the first sidelink DRX configuration, wherein the first sidelink DRX configuration is configured to configure a DRX cycle at the user equipment;
receive, from the user equipment, a sidelink DRX configuration preference; and
send, to the user equipment on the sidelink, a second sidelink DRX configuration based on the sidelink DRX configuration preference from the user equipment.

24. An apparatus, comprising:
means for receiving a first sidelink discontinuous reception (DRX) configuration from a network;
means for configuring a sidelink DRX cycle based on the first sidelink DRX configuration;
means for receiving data for a user equipment from the network; and
means for sending the data for the user equipment to the user equipment on a sidelink in accordance with the first sidelink DRX cycle;
means for sending, to the user equipment on the sidelink, the first sidelink DRX configuration, wherein the first sidelink DRX configuration is configured to configure a DRX cycle at the user equipment;
means for receiving, from the user equipment, a sidelink DRX configuration preference; and
means for sending, to the user equipment on the sidelink, a second sidelink DRX configuration based on the sidelink DRX configuration preference from the user equipment.

* * * * *